United States Patent [19]

Lin

[11] Patent Number: 5,386,578

[45] Date of Patent: Jan. 31, 1995

[54] METHOD FOR SORTING AND MERGING IN A DATA PROCESSING SYSTEM USING A MATRIX OF CELLS

[76] Inventor: Min H. Lin, 145 Ward St., Apt. #67, Revere, Mass. 02151

[21] Appl. No.: 816,176

[22] Filed: Jan. 2, 1992

[51] Int. Cl.⁶ ............................................. G06F 7/00
[52] U.S. Cl. ..................... 395/800; 395/600; 364/222.9; 364/259; 364/260.4; 364/DIG. 1; 340/146.2
[58] Field of Search ........................ 395/800, 600, 425; 340/146.2; 360/54, 39; 365/230, 240

[56] References Cited

U.S. PATENT DOCUMENTS

| | | | |
|---|---|---|---|
| 3,029,413 | 2/1957 | O'Connor | 360/54 |
| 3,336,580 | 2/1964 | Armstrong | 395/800 |
| 3,514,760 | 9/1967 | Kautz | 395/800 |
| 4,611,310 | 9/1986 | Durbin | 365/230 |

*Primary Examiner*—Thomas C. Lee
*Assistant Examiner*—Jennifer M. Orzech
*Attorney, Agent, or Firm*—John P. McGonagle

[57] ABSTRACT

In a data processing system having on-line storage containing data entities to be sorted and a central processor unit, a sorting machine interconnected with both. The sorting machine functions independently of the central processor unit except for the use of a start and finish signal. The sorting machine contains all logic elements required for sorting and merging thus rendering it independent of the central processor unit. The sorting machine includes two control buffers holding data representing parameters selected for the data processing operation, a job identification control buffer, and a plurality of cells each of which contains two key buffers holding data used for a sort/merge basis, two pointer buffers holding data defining an original sequence order for key data, a control register for indicating the last data to be sorted, and a processor for logically comparing pairs of data entities being sorted and for determining further cell directions.

2 Claims, 27 Drawing Sheets

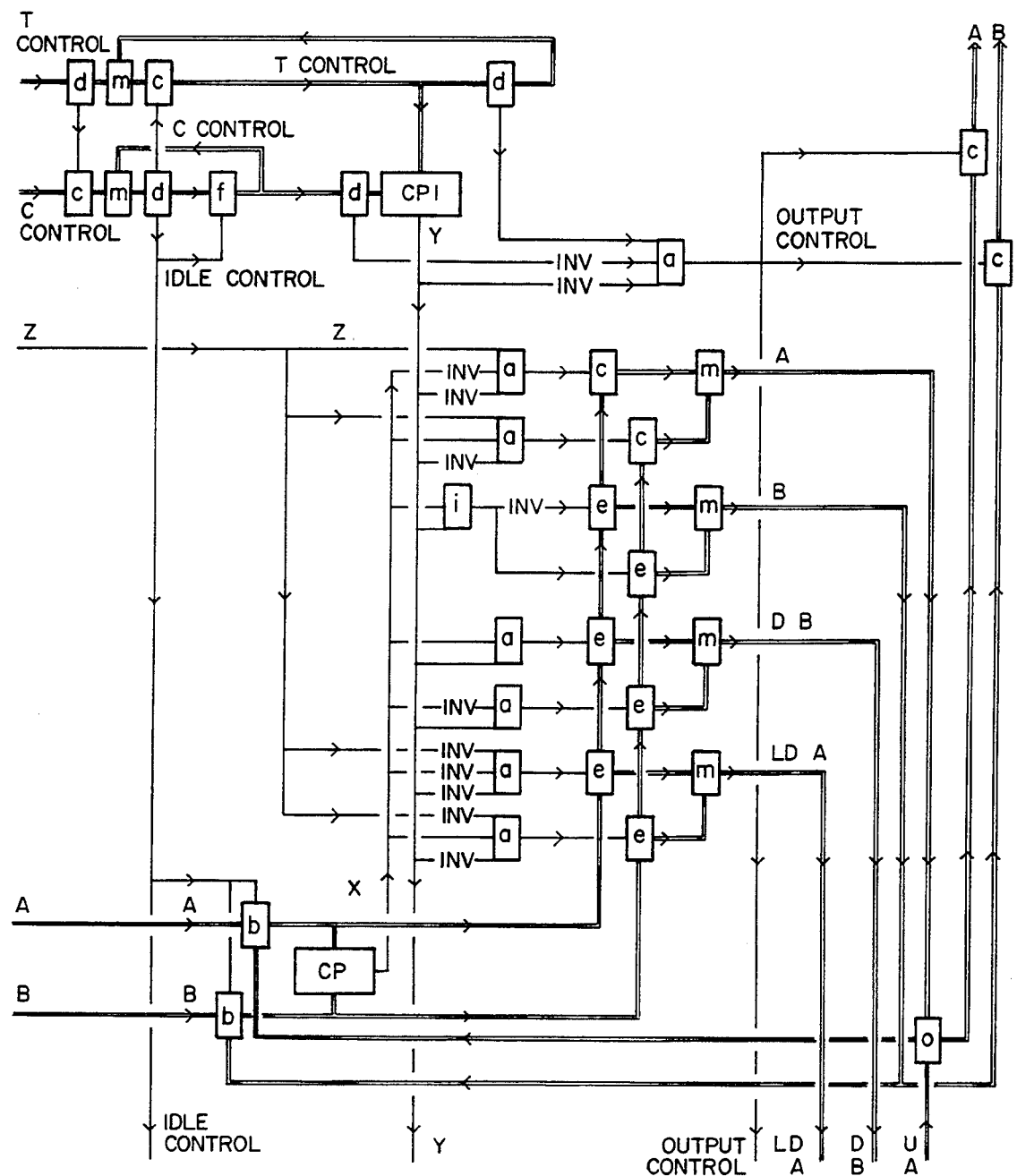
FIG. IIA

METHOD FOR SORTING AND MERGING IN A DATA PROCESSING SYSTEM USING A MATRIX OF CELLS

BACKGROUND OF THE INVENTION

This invention relates to data processing, and more particularly to a machine for data sorting.

Most data processing applications require some data sort/merge capability. Sort/merge utility computer software programs of various types are most commonly used. When sort/merge requirements are handled by software, the program is executed one program statement at a time, and one comparison at a time. This approach consumes a substantial amount of computer central processor unit (CPU) executing time and prevents the CPU not only from going to the next procedure, but also from doing the next job. Sorting is generally acknowledged to be one of the most time consuming procedures for which computers are used. This is especially so when multiple input and output operations are involved between secondary storage (disk) and memory in order to sort data in sequence thereby causing the system to be held up for data transfers.

Prior art approaches to this problem have for the most part have centered on devising more efficient algorithms and methods within a software framework. Although many advances have been made in this area, the inherent limitations within a software framework still exist.

SUMMARY OF THE INVENTION

In view of the foregoing disadvantage inherent in the prior art, the present invention provides an alternative to a software framework. As such, the general purpose of the present invention, which will be described subsequently in greater detail, is to provide a new and improved sort/merge mechanism which has greatly increased speed and little or no impact on routine CPU activities.

To attain this, the present invention moves the sort/merge functions out of the historical software framework and into a hardware based framework. The present invention provides its own cell, i.e., processor and buffer, for data input, processing and output. Unlike conventional structures which transfer data between memory and secondary storage before and after each comparison, the present invention transfers to and from memory and secondary storage only once. Because of the parallelism embedded in the design, multiple jobs can be executed at the same time.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated a several embodiments of the invention.

BRIEF DESCRIPTION OF THE DRAWINGS

FIGS. 11A and 11B are circuit block diagrams of the third embodiment (Lin 3) of the invention configured according to a first method to output results all at once, namely Method C—Output only once.

DETAILED DESCRIPTION OF THE PREFERRED EMBODIMENT

Figure 1:
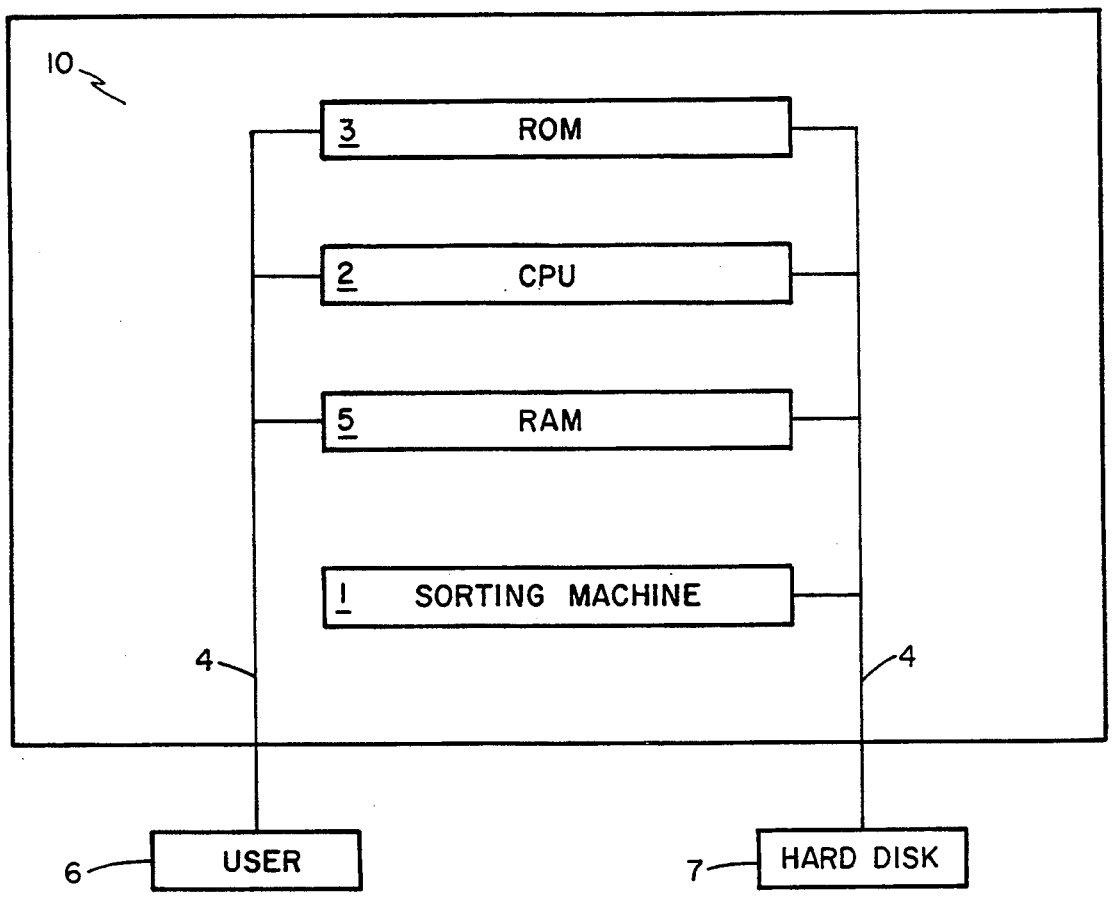
FIG. 1 is a block diagram of a standard computer system incorporating the present invention.

Referring to the drawings in detail wherein like elements are indicated by like numerals, there are shown three embodiments of sorting machines 1 constructed according to the principles of the present invention. The first 100 and second 200 invention embodiments have the capability of processing jobs in parallel. The third embodiment 300 processes a single job at a time. The fist 100, second 200 and third 300 embodiments process data in parallel. However, the third embodiment 300 is designed for a smaller system such as personal computer which operates with a single user only to allow one job at a time. The first embodiment 100 and second 200 embodiments are designed for larger systems such as supercomputers, mainframes, and minicomputers which have the capability of multiprocessing and multitasking to handle multiple jobs at a time.

FIG. 1 illustrates a typical computer configuration incorporating a sorting machine 1. A standard computer 10 will generally contain a central processor unit (CPU) 2, read-only-memory (ROM) 3, random-access-memory (RAM) 5, a user interface 6, disk storage 7, and a data and control bus 4 interconnecting the above elements. The sorting machine 1 is attached to the bus 4 and has access to memory 5 and disk storage 7 in the bus structure.

First Embodiment

Figure 2:
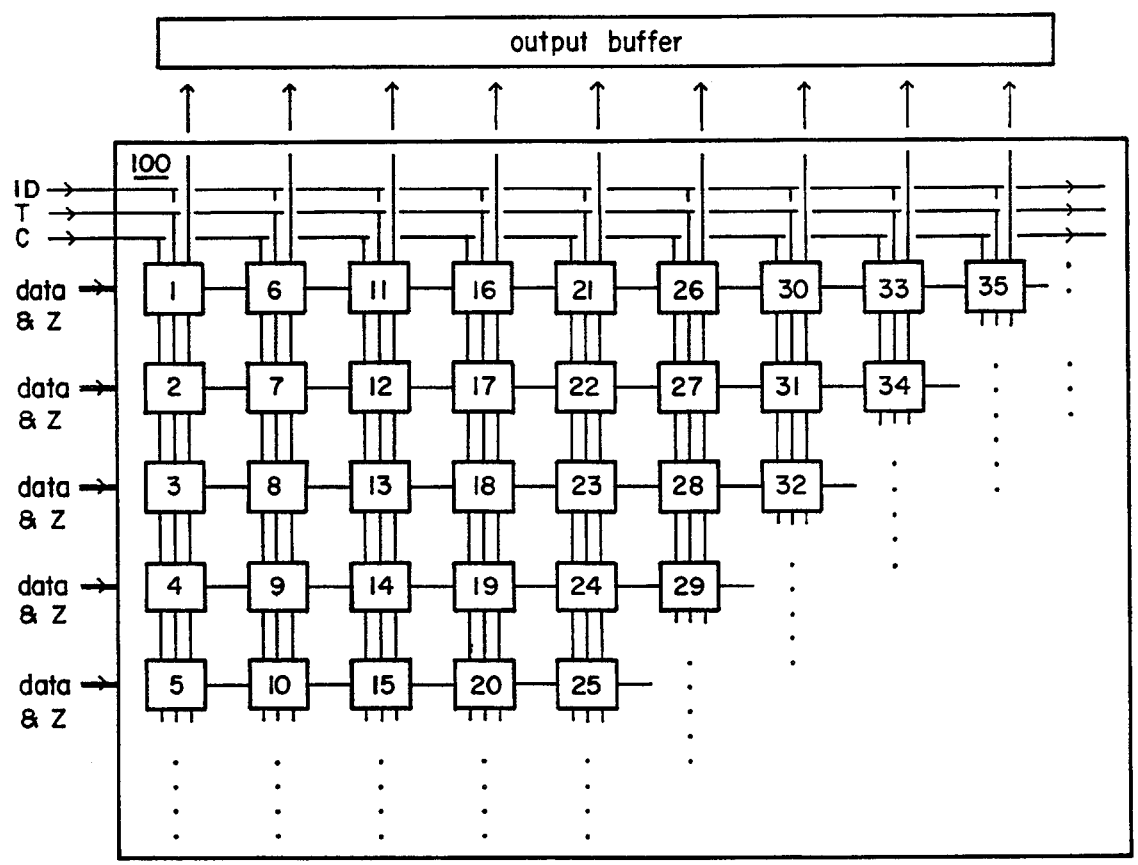
FIG. 2 illustrates the schematic structure of one embodiment (Lin 1) of the invention.

The first embodiment 100 of the invention, hereinafter sometimes referred to as Lin1, is a parallel processor which can be attached to a computer system as an extended system. FIG. 2 shows an example with a structure of 5 rows and 9 columns. This structure can be expanded to n/2 rows and n-1 columns for n number of keys to be sorted/merged as necessary. The structure contains a number of cells, C-control, T-control, and Job Id. Each block of cells contains an A-key buffer and a B-key buffer, an A-pointer buffer, a B-pointer buffer, Z-control, and a processor.

Using a structure of 5 rows and 9 columns the process can be demonstrated. When the user 6 gives a command to sort and/or merge file(s) in sequence order, the CPU 2 begins to load data from hard disk 7 or memory 5 into cells 1 to 5 in pairs. The first two pieces of data are loaded into cell 1 associated with pointer value 1 and 2 respectively. The next two pieces of data are loaded into cell 2 along with pointer value 3 and 4 respectively, and so on until all the data are loaded into their proper positions with their pointer value in ascending order. If a cell contains only one piece of data, it is paired with null value. The buffer(s) which contain(s) no data are idled. Set Z-control at cell 5 to be on, C-control to be n-1 which is 9, T-Control to be n/2 which is 5, and job ID to be 1. When the initial loading is complete, the sort/merge process begins. The process continues until C-control or T-control is equal to zero. In the example, C-control is decremented by 1 to be 8 which is greater than T-control. So the smaller key at cell 1 is moved to cell 6 with its pointer, and the larger key is moved to cell 7 with its pointer. The smaller key at cell 2 is moved to cell 6 with its pointer, and the larger key is moved to cell 8 with its pointer. The smaller key at cell 3 is moved to cell 7 with its pointer, and the larger key is moved to cell 9 with its pointer. The smaller key at cell 4 is moved to cell 8 with its pointer, and the larger key is moved to cell 10 with its pointer. Because Z-control is on at cell 5, the smaller key at cell 5 is moved to cell 9 with its pointer, and the larger key is moved to cell 10 with its pointer. Z-control at cell 10 is turned on. C-control is passed to C-control at next column. T-control remains unchanged to T-control at next column. At this stage, C-control is greater than T-control, no output is produced. System then goes to next cycle. In next cycle, C-control is decremented by 1 to be 7 which is still greater than T-control. The smaller key at cell 6 is moved to cell 11 with its pointer, and the larger key is moved to cell 12 with its pointer. The smaller key at cell 7 is moved to cell 11 with its pointer, and the larger key is moved to cell 13 with its pointer. The smaller key at cell 8 is moved to cell 12 with its pointer, and the larger key is moved to cell 14 with its pointer. The smaller key at cell 9 is moved to cell 13 with its pointer, and the larger key is moved to cell 15 with its pointer. Because Z-control is on at cell 10, the smaller at cell 10 is moved to cell 14 with its pointer, and the larger key is moved to cell 15 with its pointer. Z-control at cell 15 is turned on. C-control is passed to C-control at next column. T-control remains unchanged to T-control at next column. At this stage, C-control is greater than T-control, no output is produced. System then goes to next cycle. Repeat the process until all data reach cell 21, 22, 23, 24, 25. At this stage, C-control is equal to 5, T-control is equal to 5, and Z-control at cell 25 is on. After decrementing C-control by 1, C-control is equal to 4 which is less than T-control, the output control is turned on. Because C-control is less than T-control, data shifting process is changed. The smaller key and its pointer at cell 21 is output to A output buffer with job ID, and the larger key is moved to cell 26 with its pointer. The smaller key at cell 22 is moved to cell 26 with its pointer, and the larger key is moved to cell 27 with its pointer. The smaller key at cell 23 is moved to cell 27 with its pointer, and the larger key is moved to cell 28 with its pointer. The smaller key at cell 24 is moved to cell 28 with its pointer, and the larger key is moved to cell 29 with its pointer. Because Z-control is on at cell 25, the smaller key at cell 25 is moved to cell 29 with its pointer, and the larger key and its pointer is output to B output buffer with job ID. Z-control at cell 29 is turned on. C-control is passed to C-control at next column. T-control remains unchanged to T-control at next column. At this stage, C-control is not equal to zero, process continues. After decrementing C-control by 1, C-control is equal to 3 which is less than T-control, the output control is turned on. The smaller key and its pointer at cell 26 is output to A output buffer with job ID, and the larger key is moved to cell 30 with its pointer. The smaller key at cell 27 is moved to cell 30 with its pointer, and the larger key is moved to cell 31 with its pointer. The smaller key at cell 28 is moved to cell 31 with its pointer, and the larger key is moved to cell 32 with its pointer. The smaller key at cell 29 is moved to cell 32 with its pointer, and the larger key and its pointer is output to B output buffer with job ID. Z-control at cell 32 is turned on. C-control is passed to C-control at next column. T-control remains unchanged to T-control at next column. At this stage, C-control is not equal to zero, process continues. After decrementing C-control by 1, C-control is equal to 2 which is less than T-control, the output control is turned on. The smaller key and its pointer at cell 30 is output to A output buffer with job ID, and the larger key is moved to cell 33 with its pointer. The smaller key at cell 31 is moved to cell 33 with its pointer, and the larger key is moved to cell 34 with its pointer. The smaller key at cell 32 is moved to cell 34 with its pointer, and the larger key and its pointer is output to B output buffer with job ID. Z-control at cell 34 is turned on. C-control is passed to C-control at next column. T-control remains unchanged to T-control at next column. At this stage, C-control is not equal to zero, process continues. After decrementing C-control by 1, C-control is equal to 1 which is less than T-control, the output control is turned on. The smaller key and its pointer at cell 33 is output to A output buffer with job ID, and the larger key is moved to cell 35 with its pointer. The smaller key at cell 34 is moved to cell 35 with its pointer, and the larger key and its pointer is output to B output buffer with job ID. Z-control at cell 35 is turned on. C-control is passed to C-control at next column. T-control remains unchanged to T-control at next column. At this stage, C-control is not equal to zero, process continues. After decrementing C-control by 1, C-control is equal to 0 which is less than T-control, the output control is turned on. The smaller key and its pointer at cell 35 is output to A output buffer with job ID, and the larger key and its pointer is output to B output buffer with job ID. C-control is passed to C-control at next column. T-control remains unchanged to T-control at next column. At this stage, C-control is equal to zero, process stops. With this architecture, different jobs can be entered immediately one following another. This parallel structure is suitable for supercomputers, mainframes and mini-computers which are capable of handling multiprocessing and multitasking performance.

The first embodiment may be used procedurally in two ways.

The first method is as follows:

Step 1—When C-control and T-control are both greater than 0, decrement C-control by 1. If C-control is not less than T-control, then do the following:

For the first row of cells

Compare the keys A and B. The smaller key and its pointer will be moved to B-buffer of next cell, such as from cell 1 to cell 6. Another key and its pointer will be moved to B-buffer of the next down cell, such as from cell 1 to cell 7.

For the second row of cells and down

Compare the keys A and B. If Z-control is not on, then the smaller key and its pointer will be moved to A-buffer at next up cell such as from cell 2 to cell 6, and another key and its pointer will be moved to B-buffer at next down cell such as from cell 2 to cell 8. If Z-control is on, then the smaller key and its pointer will be moved to A-buffer at next up cell such as from cell 5 to cell 9, and another key and its pointer will be moved to A-buffer at next cell such as from cell 5 to cell 10.

Repeat step 1 process when C-control is not less than T-control.

Step 2—When both C-control and T-control are greater than 0, decrement C-control by 1. If C-control is less than T-control, then:

For the first row of buffers:

Compare the keys A and B. The smaller key and its pointer will output to A-output buffer, and another key and its pointer will be moved to B-buffer at next cell, such as from cell 21 to cell 26. If Z-control is on, then the smaller key and its pointer are output to A-output buffer; and the larger key and its pointer are output to B-output buffer.

For the second row of buffers and down:

Compare the keys A and B. If Z-control is not on, then the smaller key and its pointer will be moved to A-buffer at next up cell such as from cell 22 to cell 26, and another key and its pointer will be moved to B-buffer at next cell such as from cell 22 to cell 27. If Z-control is on, then the smaller key and its pointer will be moved to A-buffer at next up cell such as from cell 25 to cell 29, and the larger key and its pointer will output to B-output buffer.

Repeat the step 2 until C-control is equal to 0, where C-control will then reset T-control to 0 and turn Z-control off. Process stops.

To output the data, the smaller key is output by A-output data line and another key is output by B-output data line. The output sequence will be in ascending order in A-output buffer and then the reverse order in B-output buffer, because Lin1 outputs the smallest and the largest value, the second smallest and second largest value, . . . to the least smallest and the least largest value. If the first data contains null value, then it should be ignored.

The second method is as follows procedure:

Step 1—When C-control and T-control both are greater than 0, decrement C-control by 1.

If C-control is not less than T-control, then:

For the first row of buffers:

Compare the keys A and B. The smaller key and its pointer will be moved to A-buffer at next cell, such as cell 1 to cell 6. and another key and its pointer will be moved to A-buffer at next down cell, such as cell 1 to cell 7.

For the second row of buffers and down:

Compare the keys A and B. If Z-control is not on, then the smaller key and its pointer will be moved to B-buffer at next up cell such as from cell 2 to cell 6, and another key and its pointer will be moved to A-buffer at next down cell such as from cell 2 to cell 8. If Z-control is on, then the smaller key and its pointer will be moved to B-buffer at next up cell such as from cell 5 to cell 9, and another key and its pointer will be moved to B-buffer at next cell such as from cell 5 to cell 10.

Repeat step 1 when C-control is not less than T-control.

Step 2—When C-control and T-control are greater than 0, decrement C-control by 1.

If C-control is less than T-control, then:

For the first row of buffers:

Compare the keys A and B. The smaller key and its pointer will output to A-output buffer, and another key and its pointer will be moved to B-buffer at next cell, such as from cell 21 to cell 26. If Z-control is on, then the smaller key and its pointer are output to A-output buffer, and the larger key and its pointer are output to B-output buffer.

For the second row of buffers and down:

Compare the keys A and B. If Z-control is not on, then the smaller key and its pointer will be moved to A-buffer at next up cell such as from cell 22 to cell 26, and another key and its pointer will be moved to B-buffer at next cell such as from cell 22 to cell 27. If Z-control is on, then the smaller key and its pointer will be moved to A-buffer at next up cell such as from cell 25 to cell 29, and another key and its pointer will output to B-output buffer.

Repeat the step 2 until C-control is equal to 0, where C-control will then reset T-control to 0 and turns Z-control off. Process stops.

To output the data, the smaller key is output by A-output data line and another key is output by B-output data line. The output sequence will in ascending in A-output buffer and then the reverse order in B-output buffer, because Lin1 outputs the smallest and the largest value, the second smallest and second largest value, . . . to the least smallest and the least largest value. If the first data contains null value, then it should be ignored.

Second Embodiment

Figure 3:
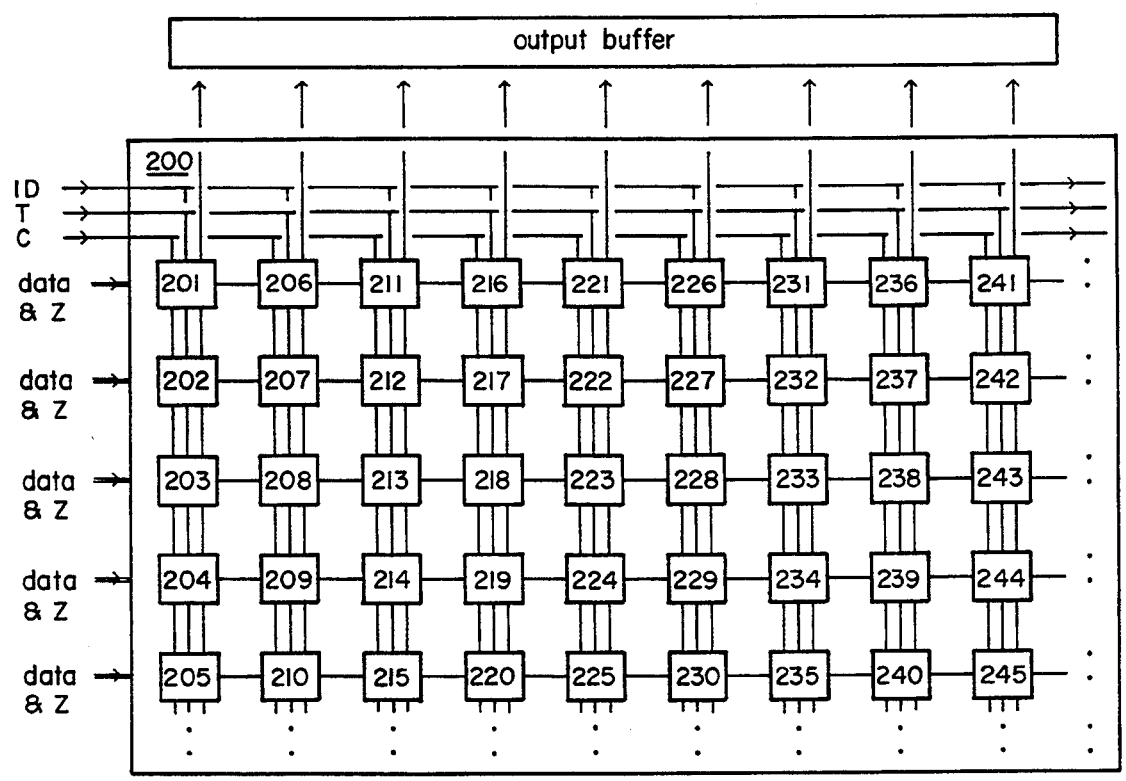
FIG. 3 illustrates the schematic structure of another embodiment (Lin 2) of the invention.

The second embodiment 200, sometimes hereinafter referred to as Lin2, is a modified model of the first embodiment 100, i.e., Lin1. FIG. 3 shows an example utilizing a structure of 5 rows and 9 columns. This structure can be expanded to n/2 rows and n-1 columns for n number of keys to be sorted/merged as well. The structure contains number of cells, C-control, T-control, and Job Id. Each cell contains an A-key buffer, B-key buffer, A-pointer buffer, B-pointer buffer, Z-control, and processor. The initial setup is same as the first embodiment 100. Set Z-control at cell 205 to be on, C-control to be n-1 which is 9, T-control to be n/2 which is 5, and job ID to be 2. When the initial loading is complete, the sort/merge process begins. The process continues until C-control or T-control is equal to zero.

In the example, C-control is decremented by 1 to be 8 which is greater than T-control. So the smaller key at cell 201 is moved to cell 206 with its pointer, and the larger key is moved to cell 207 with its pointer. The smaller key at cell 202 is moved to cell 206 with its pointer, and the larger key is moved to cell 208 with its pointer. The smaller key at cell 203 is moved to cell 207 with its pointer, and the larger key is moved to cell 209 with its pointer. The smaller key at cell 204 is moved to cell 208 with its pointer, and the larger key is moved to cell 210 with its pointer. Because Z-control is on at cell 205, the smaller key at cell 205 is moved to cell 209 with its pointer, and the larger key is moved to cell 210 with its pointer. Z-control at cell 210 is turned on. C-control is passed to C-control at next column. T-control remains unchanged to T-control at next column. At this stage, C-control is greater than T-control, no output is produced. System then goes to next cycle.

In next cycle, C-control is decremented by 1 to be 7 which is still greater than T-control. The smaller key at cell 206 is moved to cell 211 with its pointer, and the larger key is moved to cell 212 with its pointer. The smaller key at cell 207 is moved to cell 211 with its pointer, and the larger key is moved to cell 213 with its pointer. The smaller key at cell 208 is moved to cell 212 with its pointer, and the larger key is moved to cell 214 with its pointer. The smaller key at cell 209 is moved to cell 213 with its pointer, and the larger key is moved to cell 215 with its pointer. Because Z-control is on at cell 210, the smaller at cell 210 is moved to cell 214 with its pointer, and the larger key is moved to cell 215 with its pointer. Z-control at cell 215 is turned on. C-control is passed to C-control at next column. T-control remains unchanged to T-control at next column. At this stage, C-control is greater than T-control, no output is produced. System then goes to next cycle.

Repeat the process until all data reach cell 221, 222, 223, 224, 225. At this stage, C-control is equal to 5, T-control is equal to 5, and Z-control at cell 225 is on. After decrementing C-control, C-control is still greater than 0, the output control is off. Because C-control is less than T-control, data shifting process is changed. The smaller key and its pointer at cell 221 is moved to cell 230 with its pointer because Z-control at cell 225 is on, and the larger key is moved to cell 226 with its pointer. The smaller key at cell 222 is moved to cell 226 with its pointer, and the larger key is moved to cell 227 with its pointer. The smaller key at cell 223 is moved to cell 227 with its pointer, and the larger key is moved to cell 228 with its pointer. The smaller key at cell 224 is moved to cell 228 with its pointer, and the larger key is moved to cell 229 with its pointer. The smaller key at cell 225 is moved to cell 229 with its pointer, and the larger key and its pointer is moved to cell 230 with its pointer. Z-control is passed to cell 230. C-control is passed to C-control at next column. T-control remains unchanged to T-control at next column. At this stage, C-control is not equal to zero, process continues.

After decrementing C-control by 1, C-control is equal to 3 which is greater than 0, the output control is off. The smaller key and its pointer at cell 226 is moved to cell 235 with its pointer because Z-control at cell 230 in on, and the larger key is moved to cell 231 with its pointer. The smaller key at cell 227 is moved to cell 231 with its pointer, and the larger key is moved to cell 232 with its pointer. The smaller key at cell 228 is moved to cell 232 with its pointer, and the larger key is moved to cell 233 with its pointer. The smaller key at cell 229 is moved to cell 233 with its pointer, and the larger key and its pointer is moved to cell 234 with its pointer. The smaller key at cell 230 is moved to cell 234 with its pointer, and the larger key and its pointer is moved to cell 235 with its pointer. Z-control at cell 235 is turned on. C-control is passed to C-control at next column. T-control remains unchanged to T-control at next column. At this stage, C-control is not equal to zero, process continues.

After decrementing C-control by 1, C-control is equal to 2 which is greater 0, the output control is off. The smaller key and its pointer at cell 231 is moved to cell 240 with its pointer because Z-control at cell 235 in on, and the larger key is moved to cell 236 with its pointer. The smaller key at cell 232 is moved to cell 236 with its pointer, and the larger key is moved to cell 237 with its pointer. The smaller key at cell 233 is moved to cell 237 with its pointer, and the larger key is moved to cell 238 with its pointer. The smaller key at cell 234 is moved to cell 238 with its pointer, and the larger key and its pointer is moved to cell 239 with its pointer. The smaller key at cell 235 is moved to cell 239 with its pointer, and the larger key and its pointer is moved to cell 240 with its pointer. Z-control at cell 240 is turned on. C-control is passed to C-control at next column. T-control remains unchanged to T-control at next column. At this stage, C-control is not equal to zero, process continues.

After decrementing C-control by 1, C-control is equal to 1 which is still greater than 0, the output control is off. The smaller key and its pointer at cell 236 is moved to cell 245 with its pointer because Z-control at cell 240 in on, and the larger key is moved to cell 241 with its pointer. The smaller key at cell 237 is moved to cell 241 with its pointer, and the larger key is moved to cell 242 with its pointer. The smaller key at cell 238 is moved to cell 242 with its pointer, and the larger key is moved to cell 243 with its pointer. The smaller key at cell 239 is moved to cell 243 with its pointer, and the larger key and its pointer is moved to cell 244 with its pointer. The smaller key at cell 240 is moved to cell 244 with its pointer, and the larger key and its pointer is moved to cell 245 with its pointer. Z-control at cell 245 is turned on. C-control is passed to C-control at next column. T-control remains unchanged to T-control at next column. At this stage, C-control is not equal to zero, process continues.

After decrementing C-control by 1, C-control is equal to 0 which is less than T-control and T-control is greater than 0, the output control is turned on. The smaller keys and their pointers at cell 242, 243, 244, 245, 241 are output to A output buffer with job ID in ascending order, while the larger keys and their pointer at cell 241, 242, 243, 244, 245 are output to B output buffer with job ID in ascending order. At this stage, C-control is equal to zero, process stops.

So the data output sequence is from A output buffer in ascending order and continued to B output buffer in ascending order. With this architecture, different jobs can be entered immediately one following another. This parallel structure is suitable for supercomputer, mainframe and mini-computer which are capable of handling multiprocessing and multitasking performance.

Figure 5:
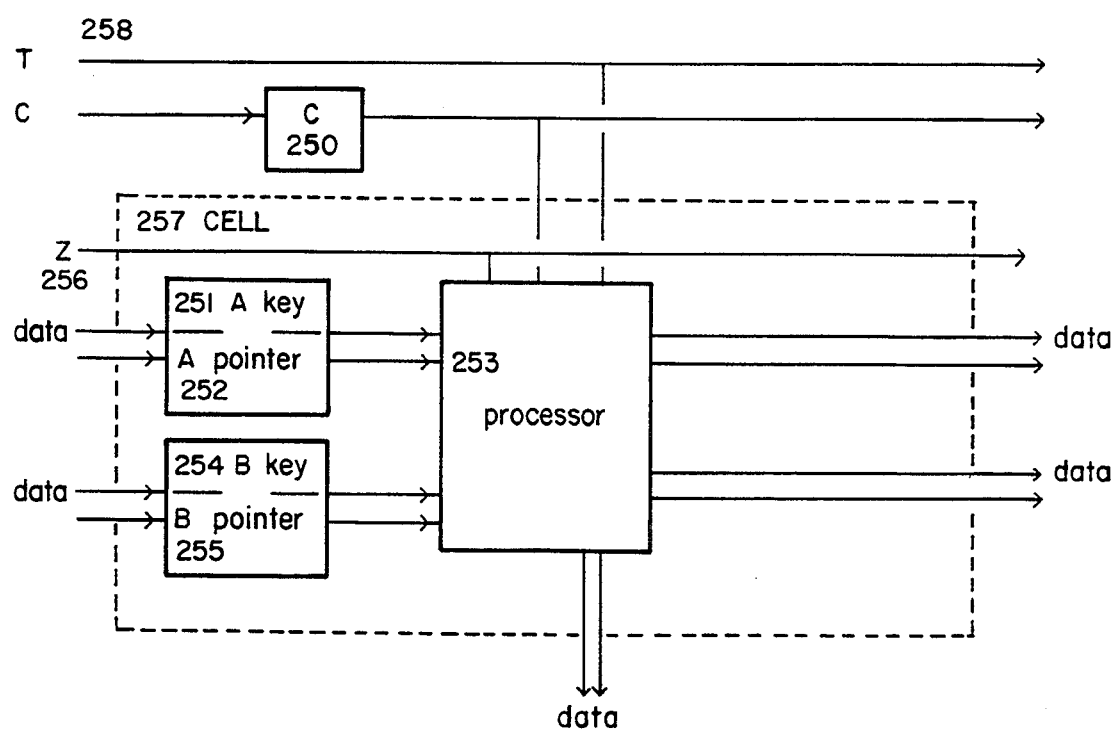
FIG. 5 is a block diagram illustrating a single sorting machine cell.
Figure 6A:
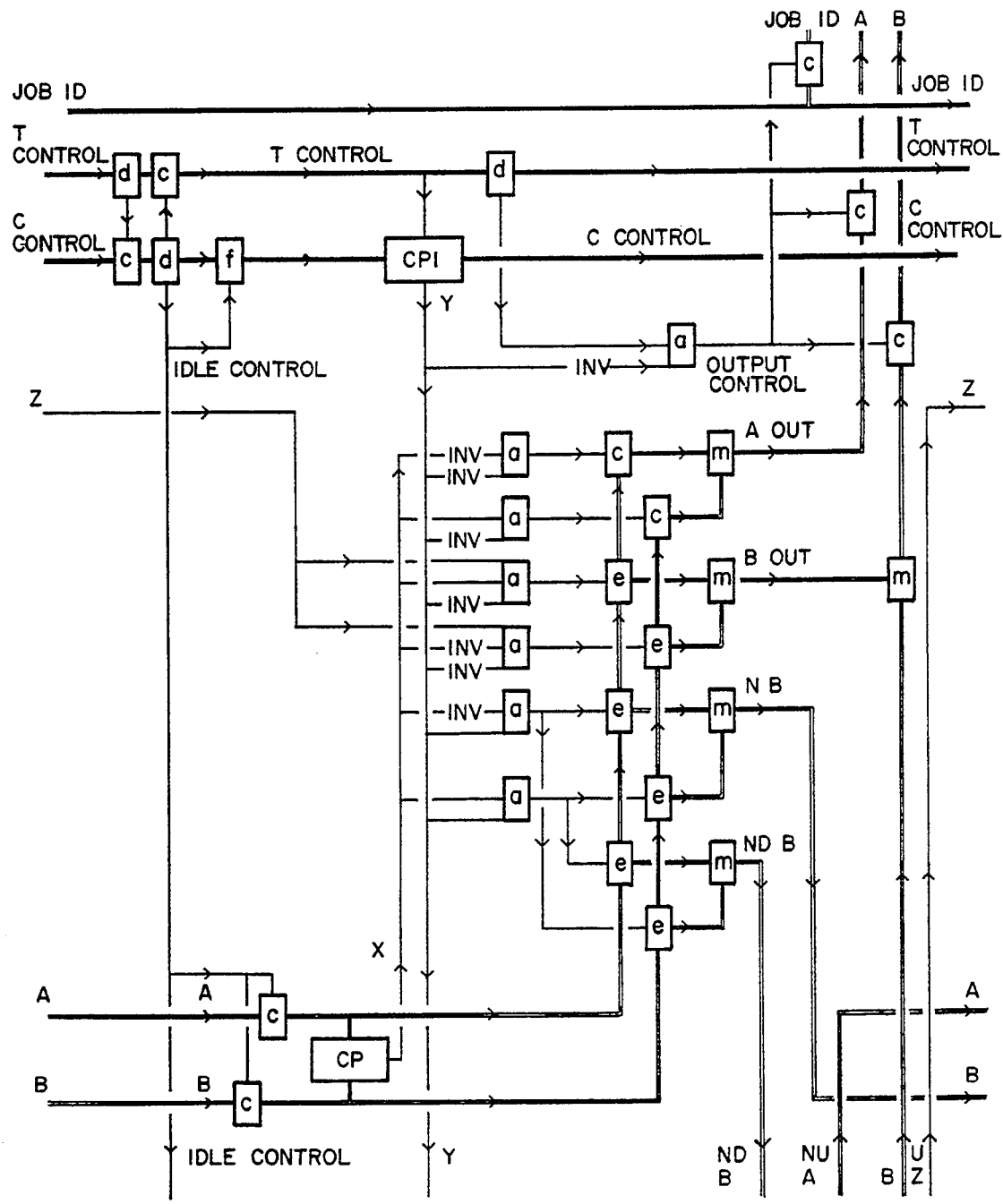
FIGS. 6A, 6B and 6C are circuit block diagrams of the first embodiment (Lin 1) of the invention configured according to a first method, namely Method C.
Figure 6B:
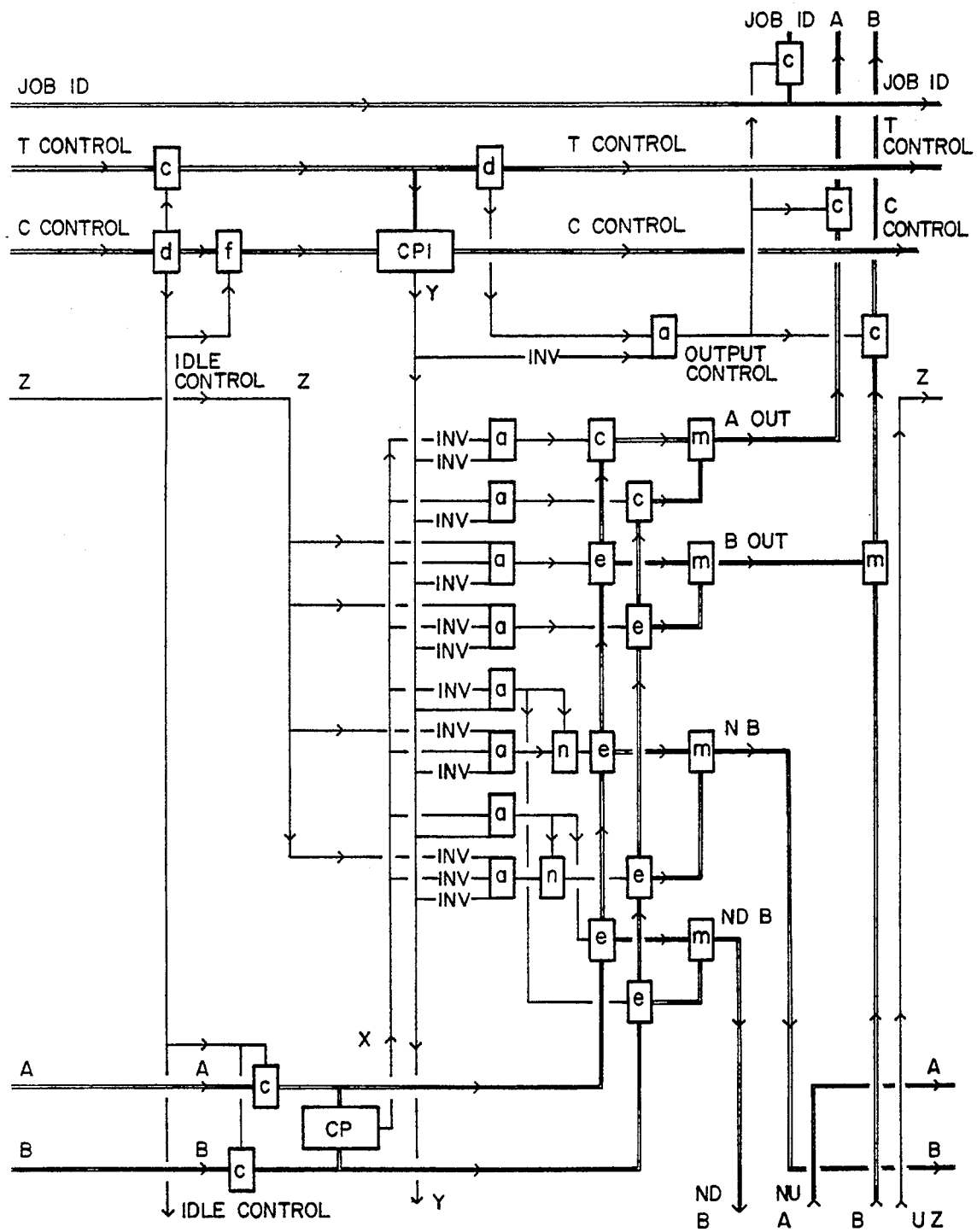
Figure 6C:
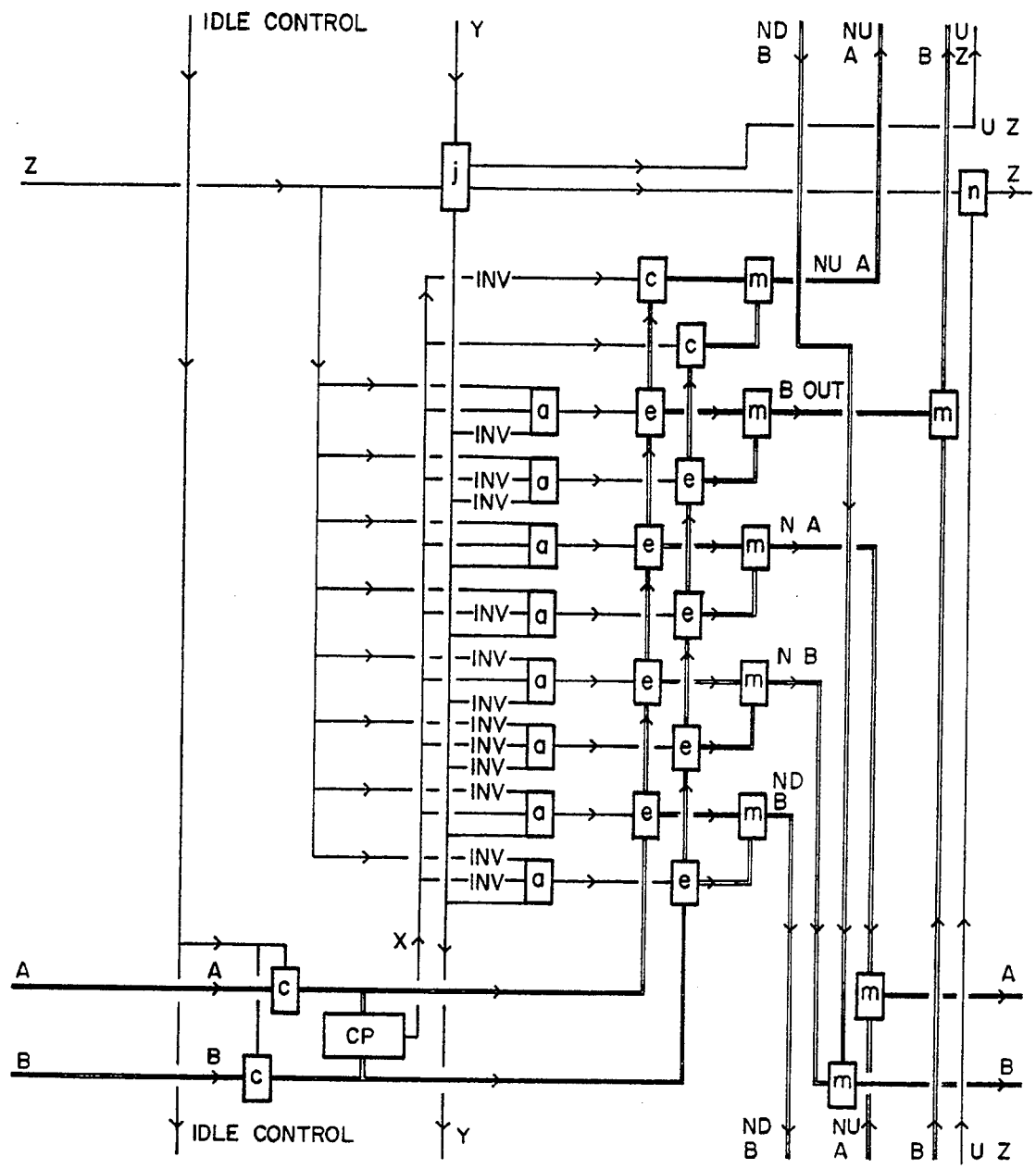
Figure 7A:
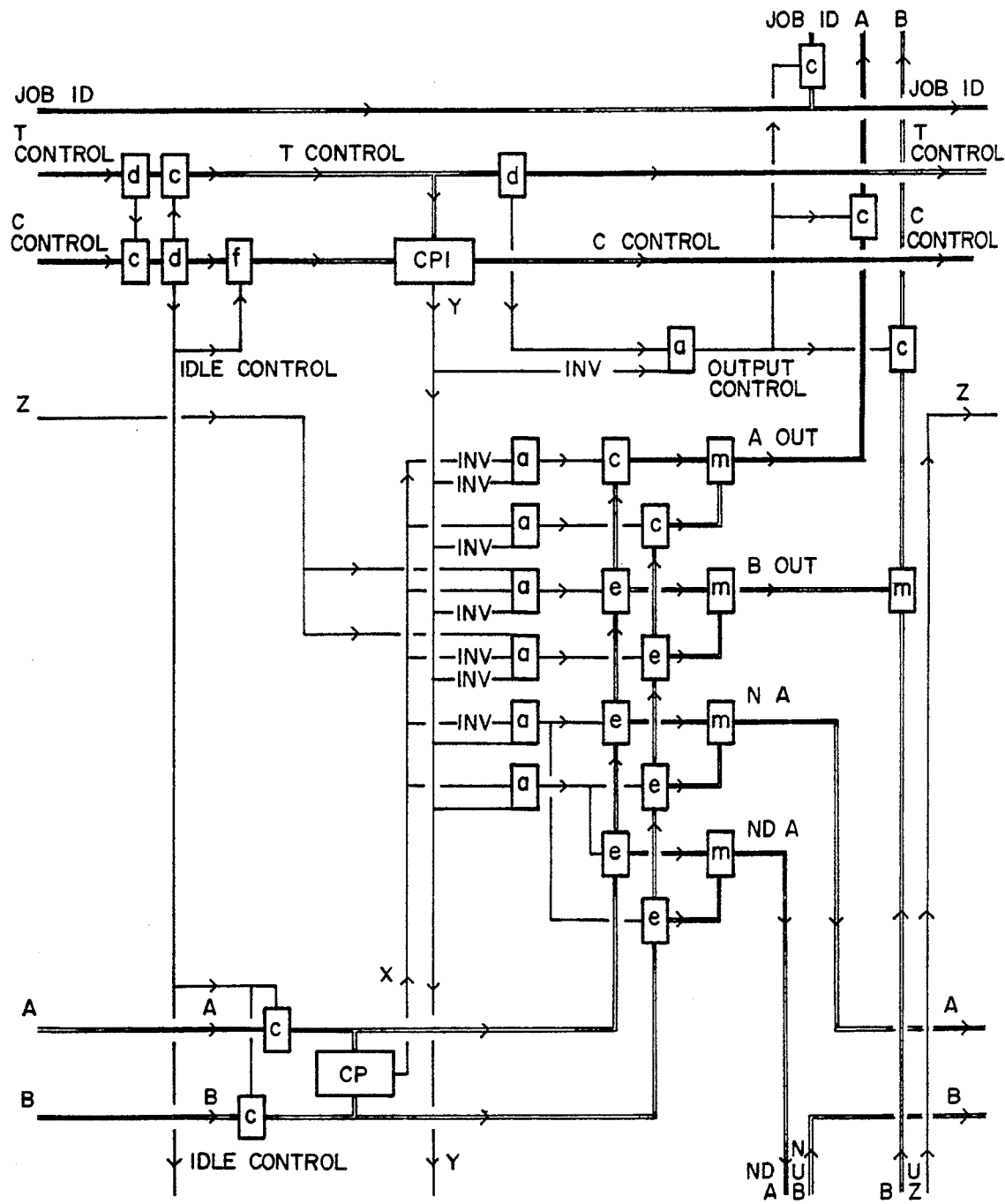
FIGS. 7A, 7B and 7C are circuit block diagrams of the first embodiment (Lin 1) of the invention configured according to a second method, namely Method D.
Figure 7B:
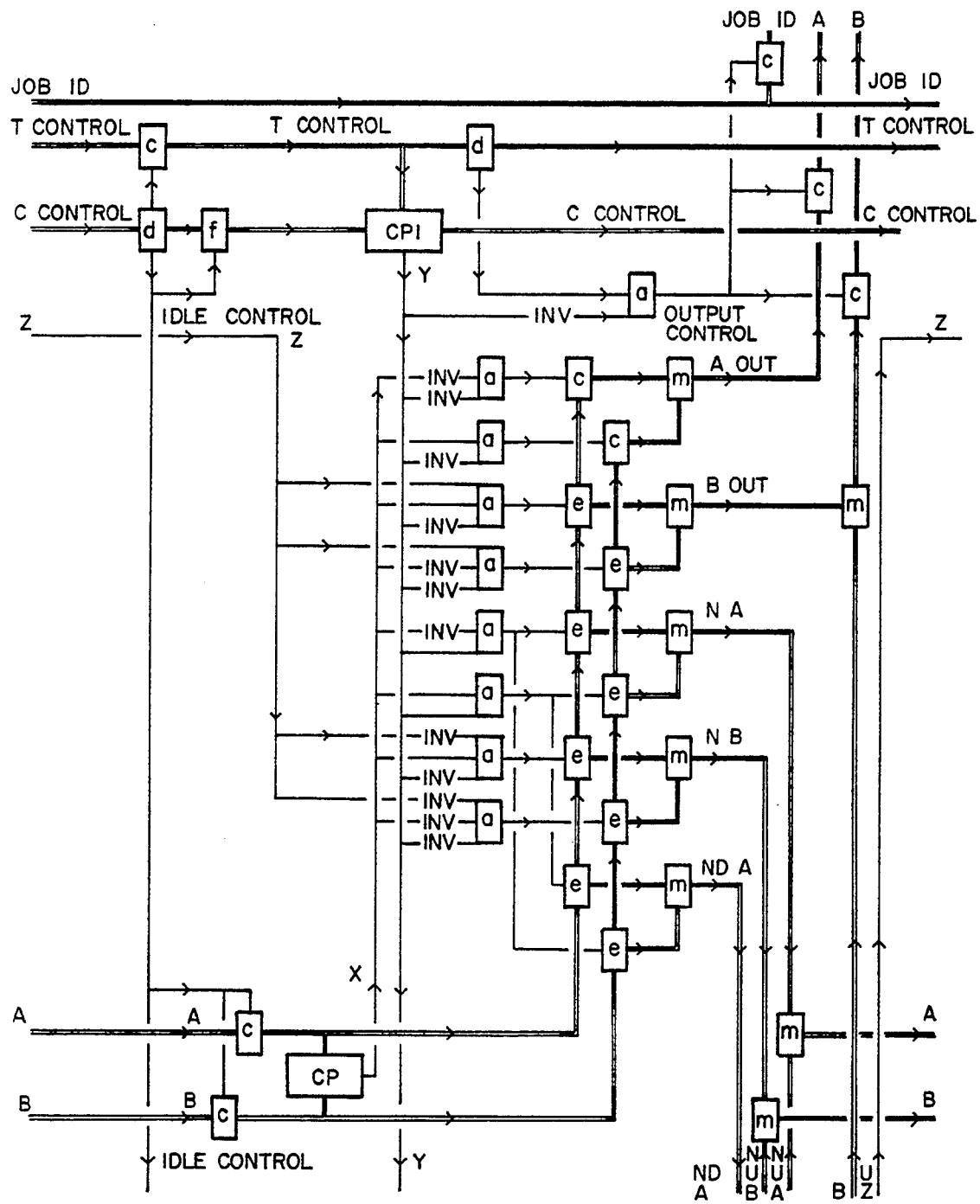
Figure 7C:
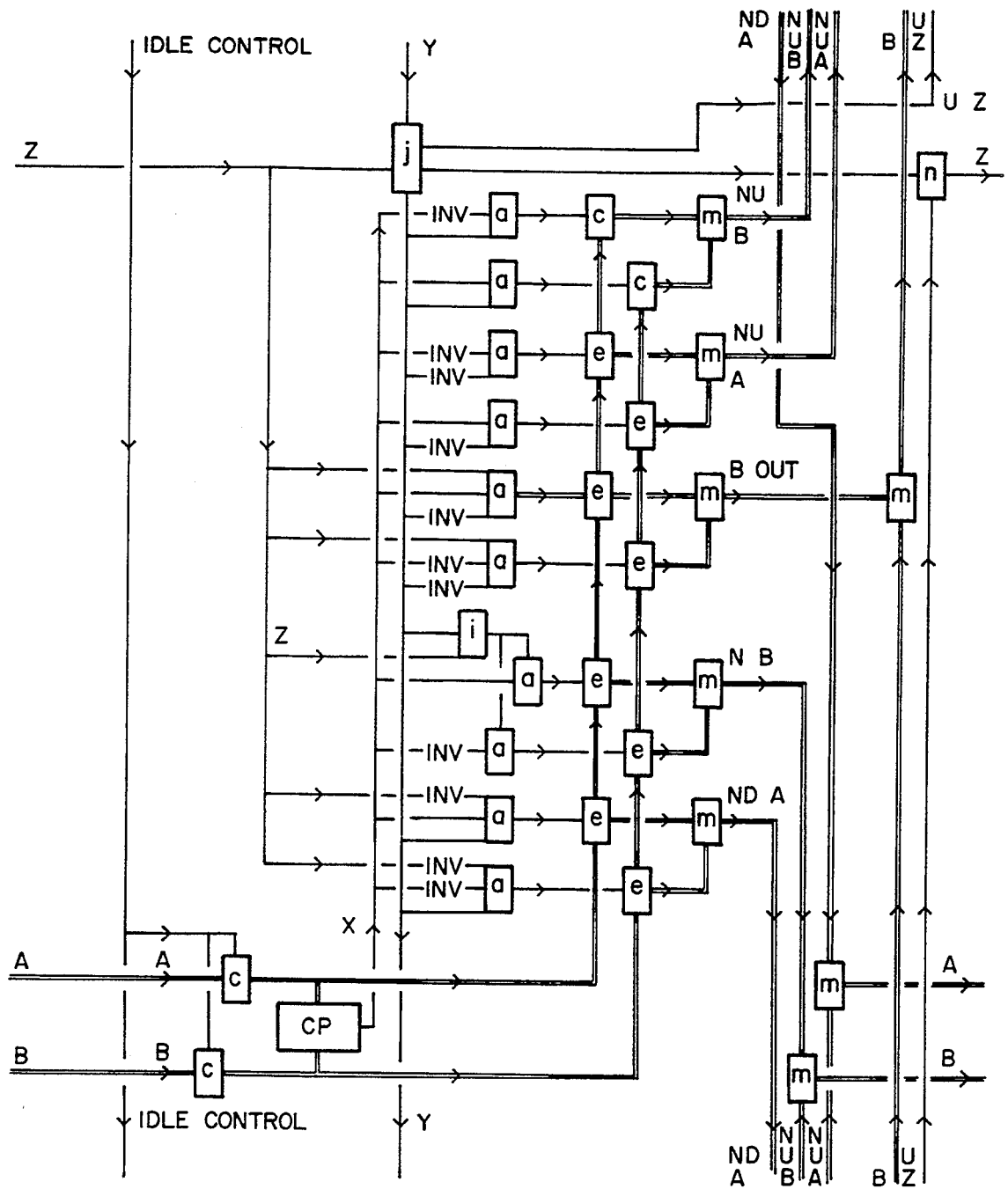
Figure 8A:
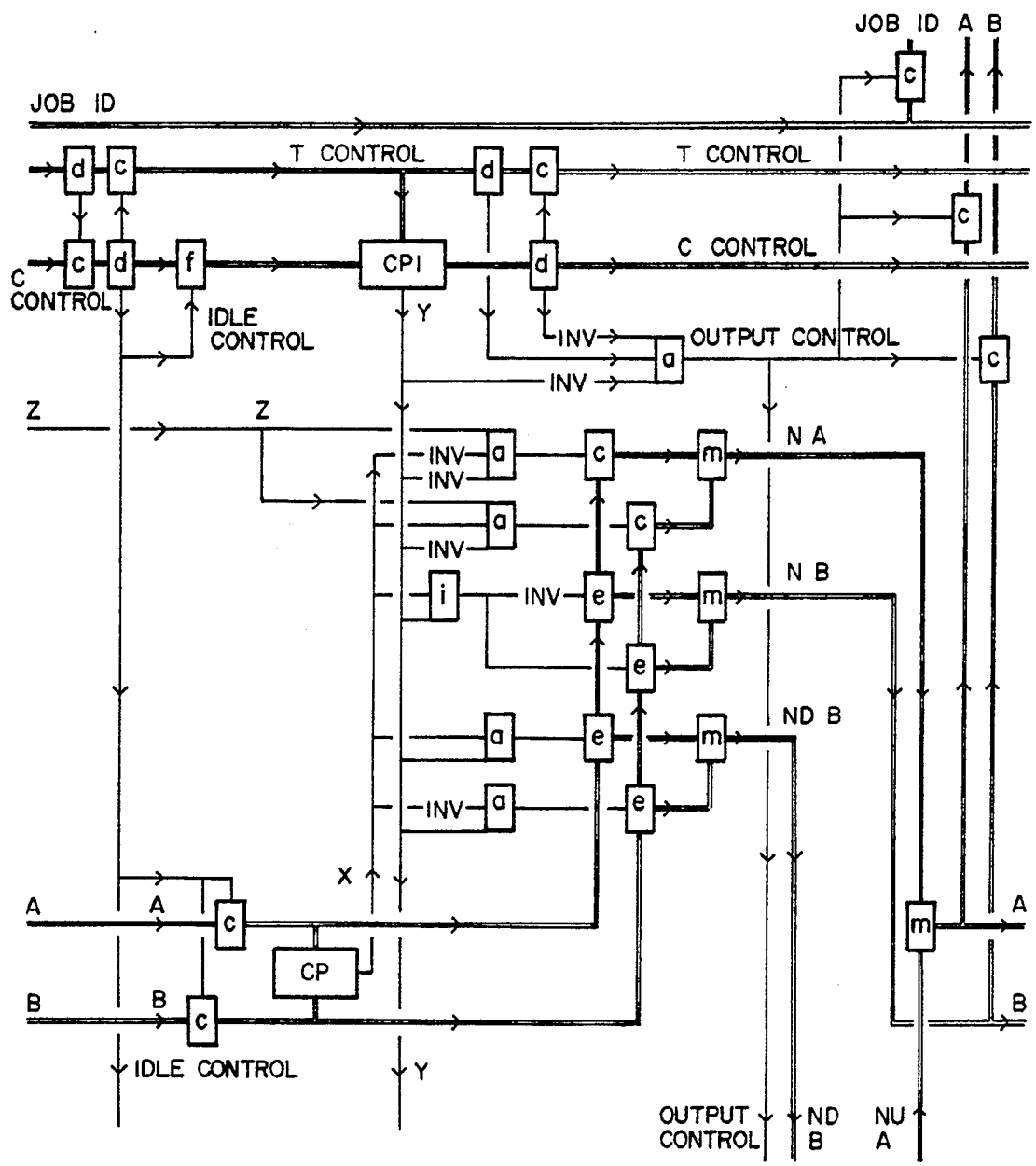
FIGS. 8A, 8B and 8C are circuit block diagrams of the second embodiment (Lin 2) of the invention configured according to a first method, namely Method C.
Figure 8B:
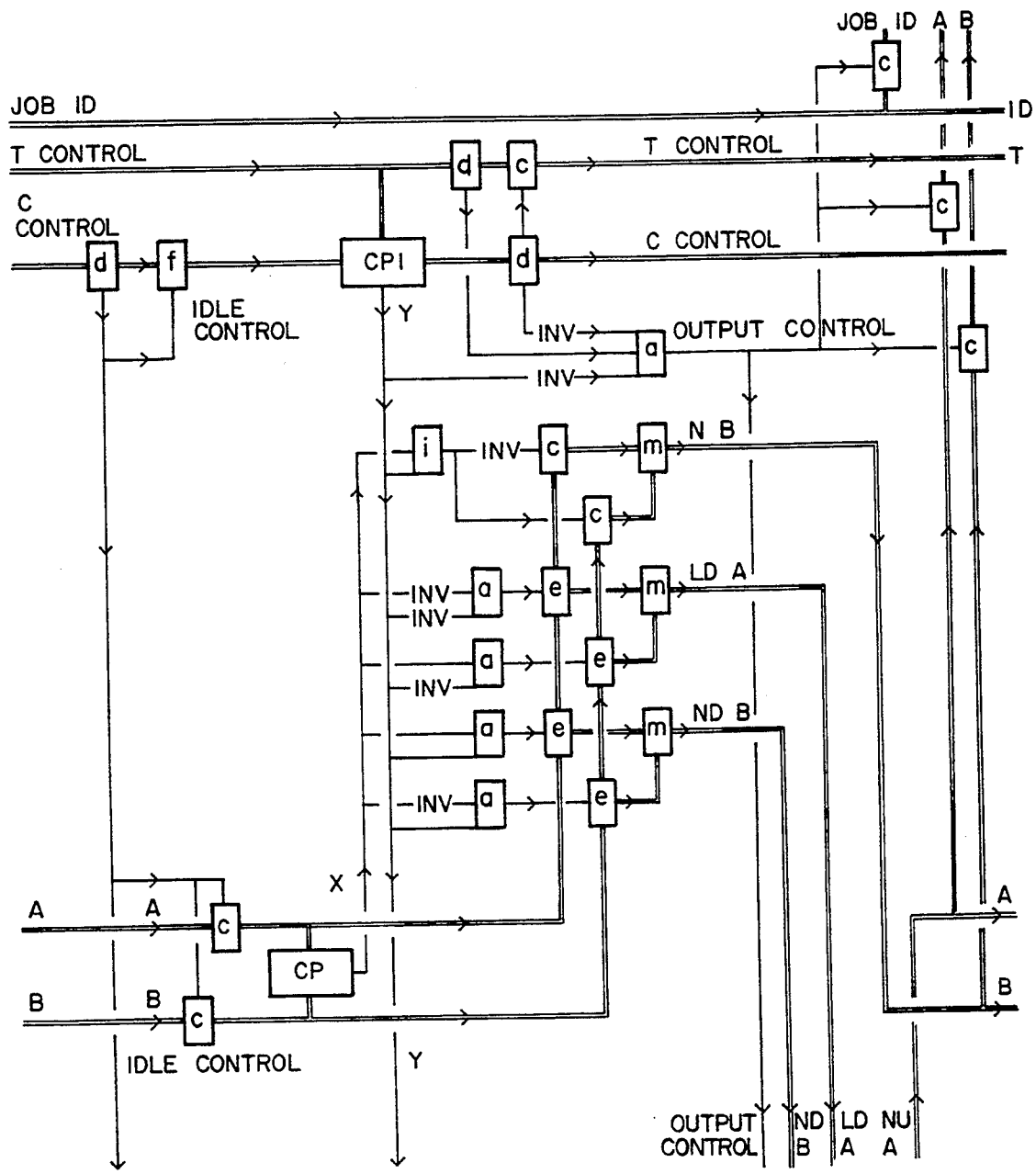
Figure 8C:
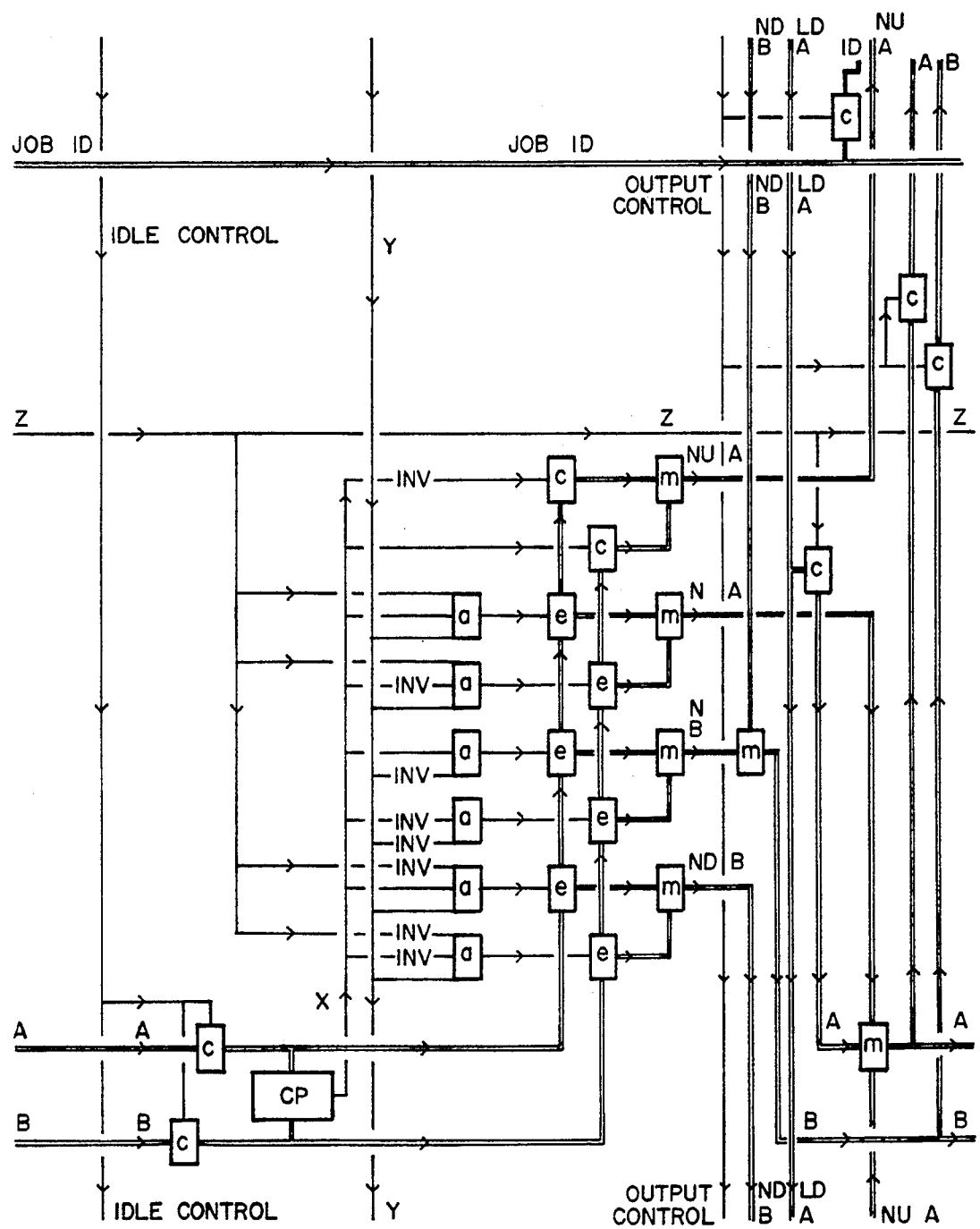
Figure 9A:
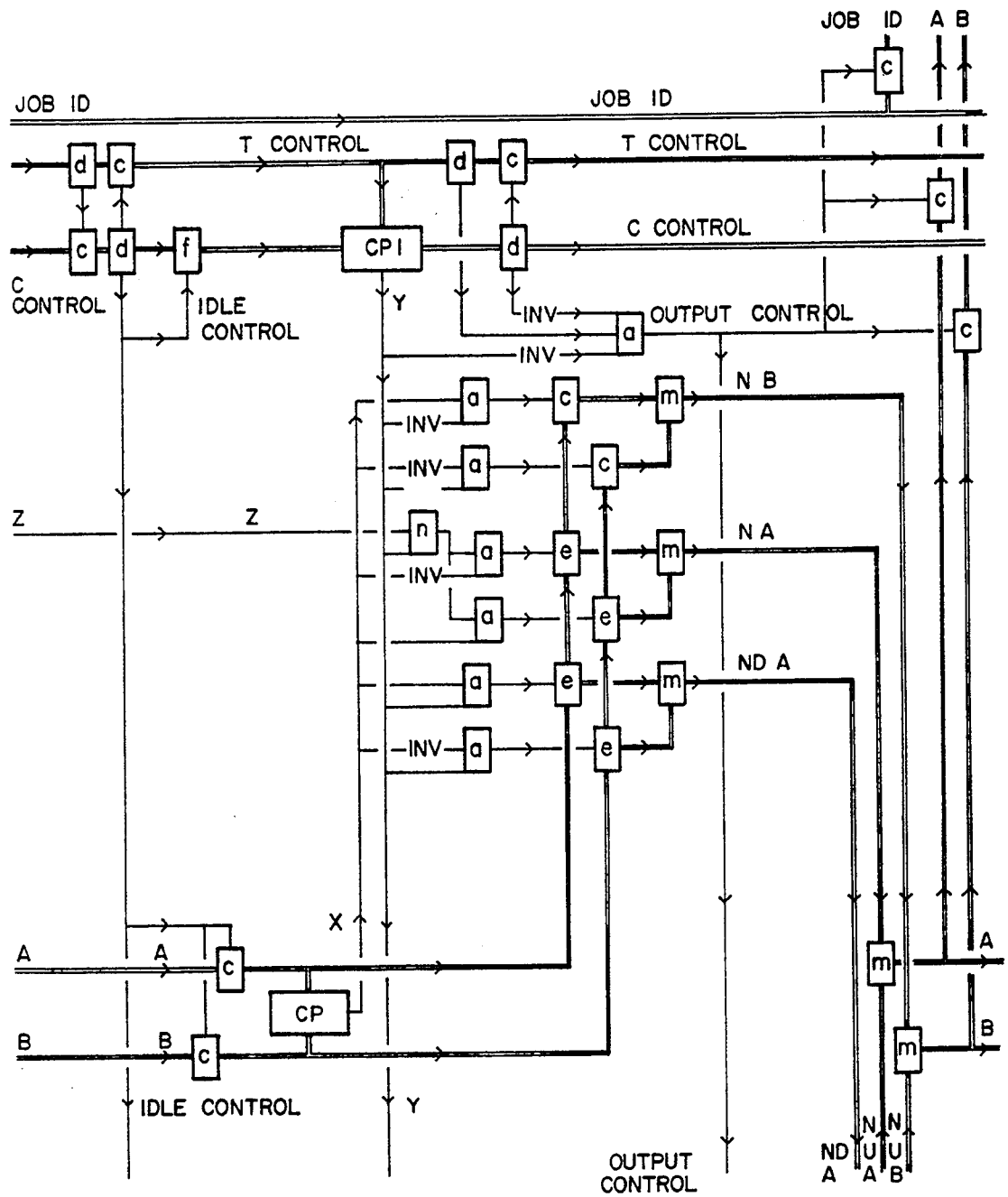
FIGS. 9A, 9B and 9C are circuit block diagrams of the second embodiment (Lin 2) of the invention configured according to a second method, namely Method D.
Figure 9B:
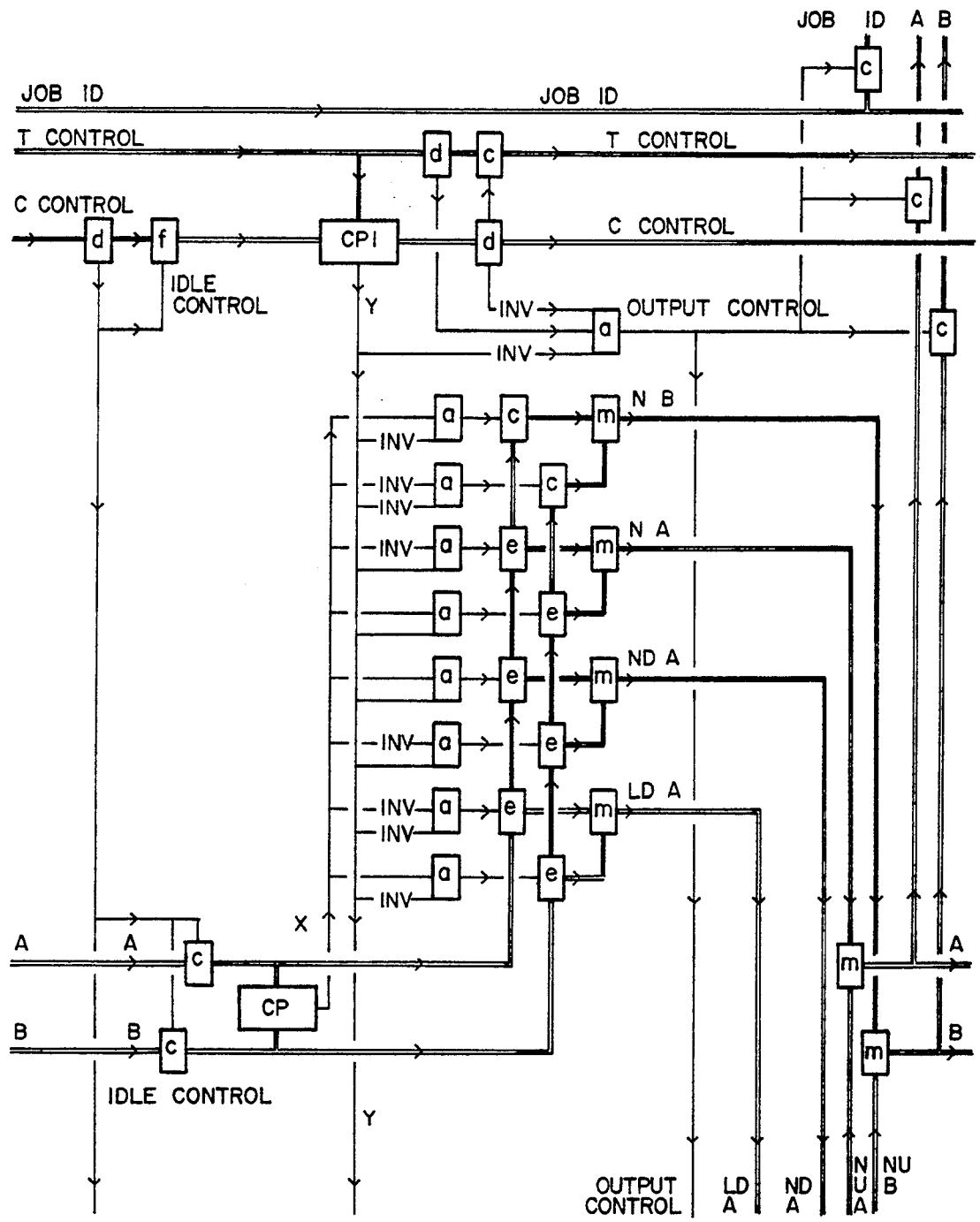
Figure 9C:
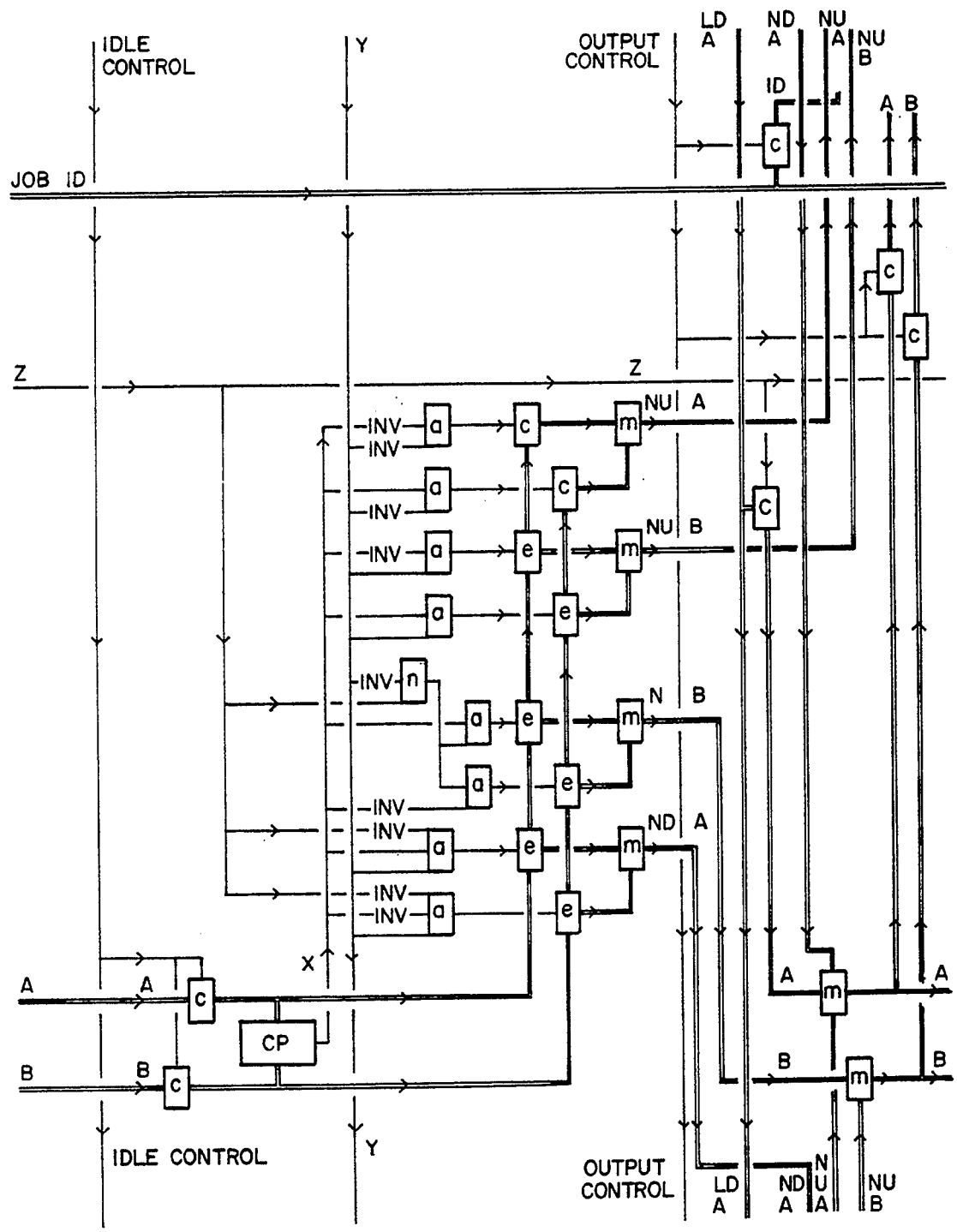
Figure 10A:
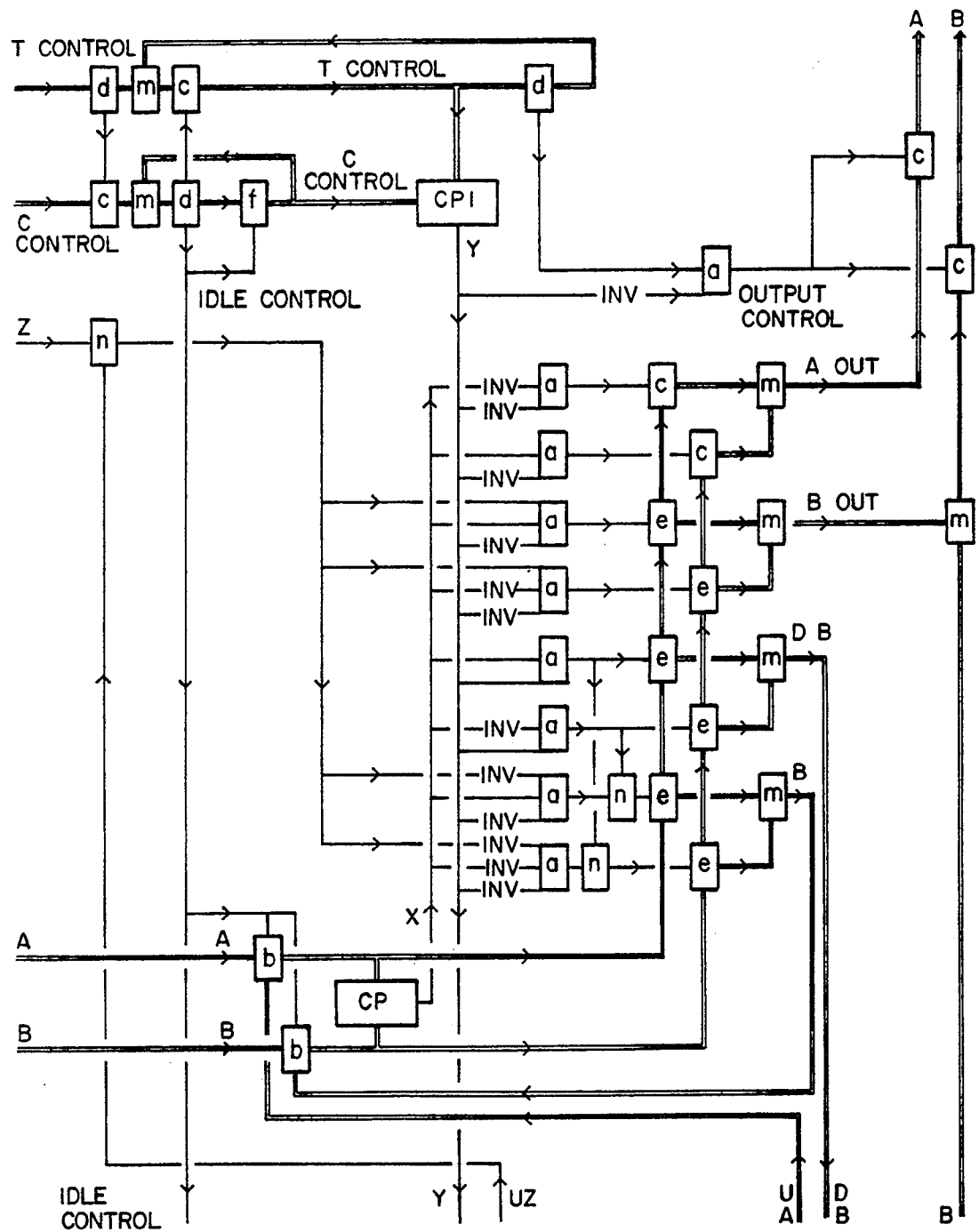
FIGS. 10A and 10B are circuit block diagrams of the third embodiment (Lin 3) of the invention configured according to a first method to output results piece by piece, namely Method C—Output piece by piece.
Figure 10B:
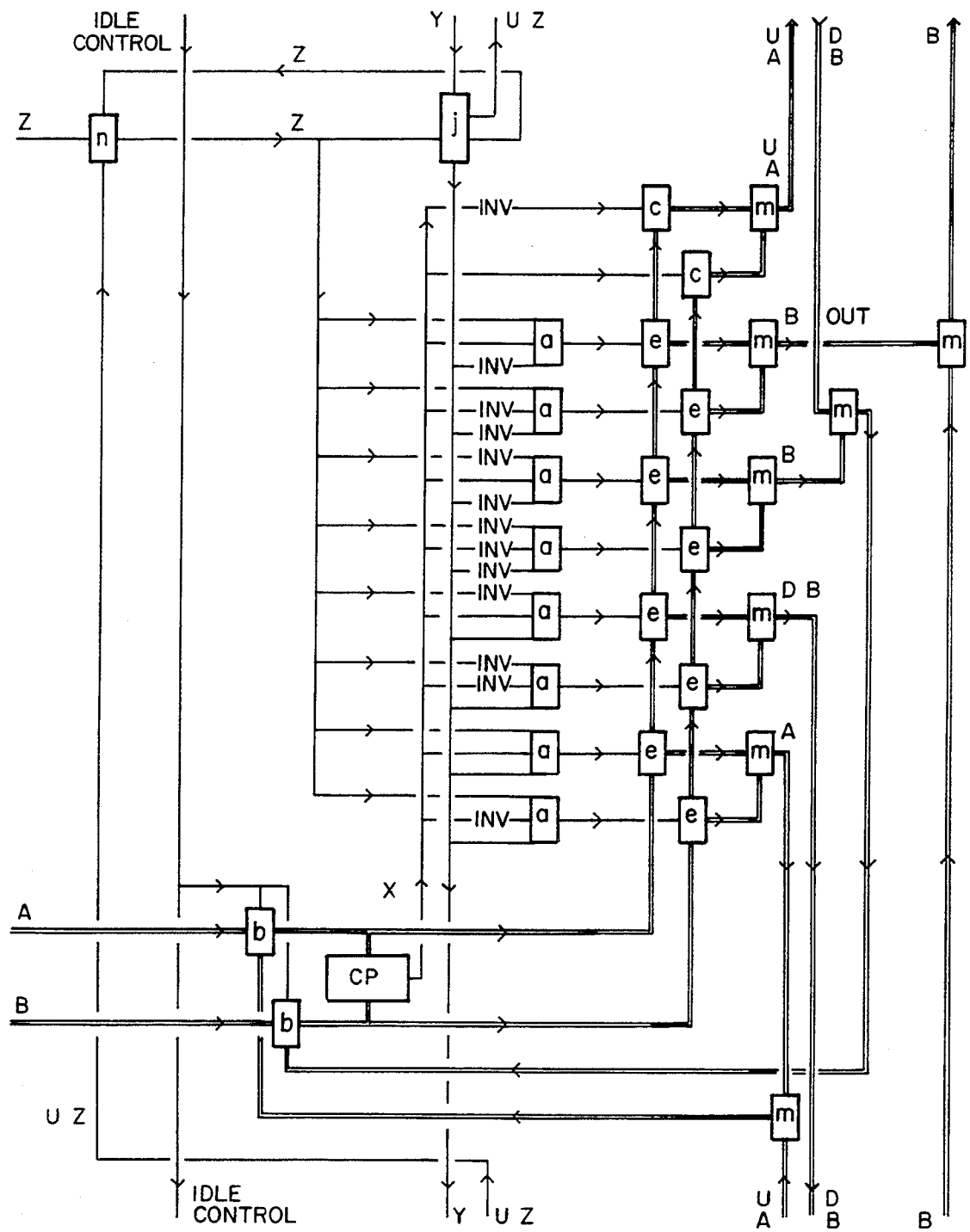
Figure 11B:
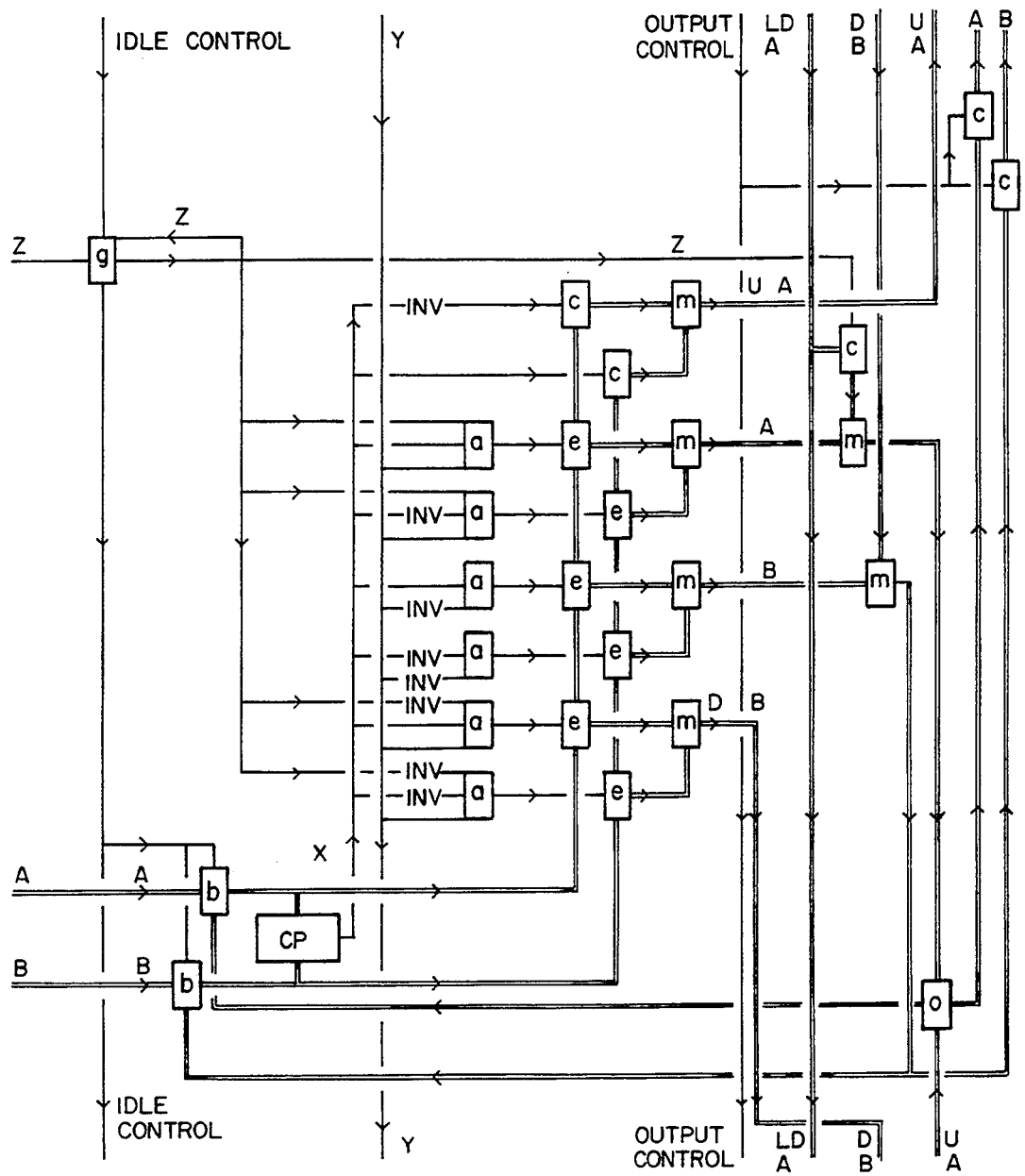
Figure 12A:
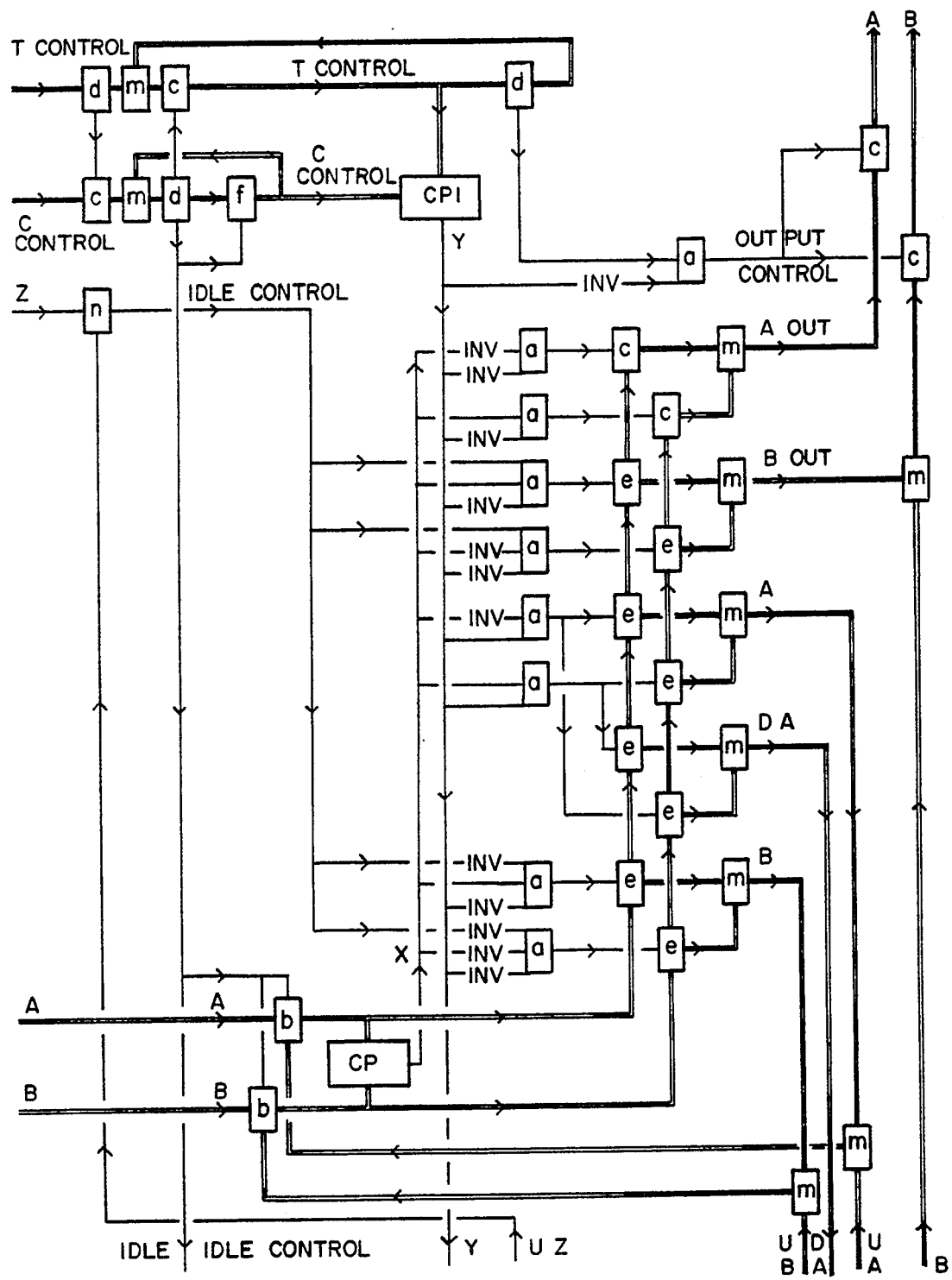
FIGS. 12A and 12B are circuit block diagrams of the third embodiment (Lin 3) of the invention configured according to a second method to output results piece by piece, namely Method D—Output piece by piece.
Figure 12B:
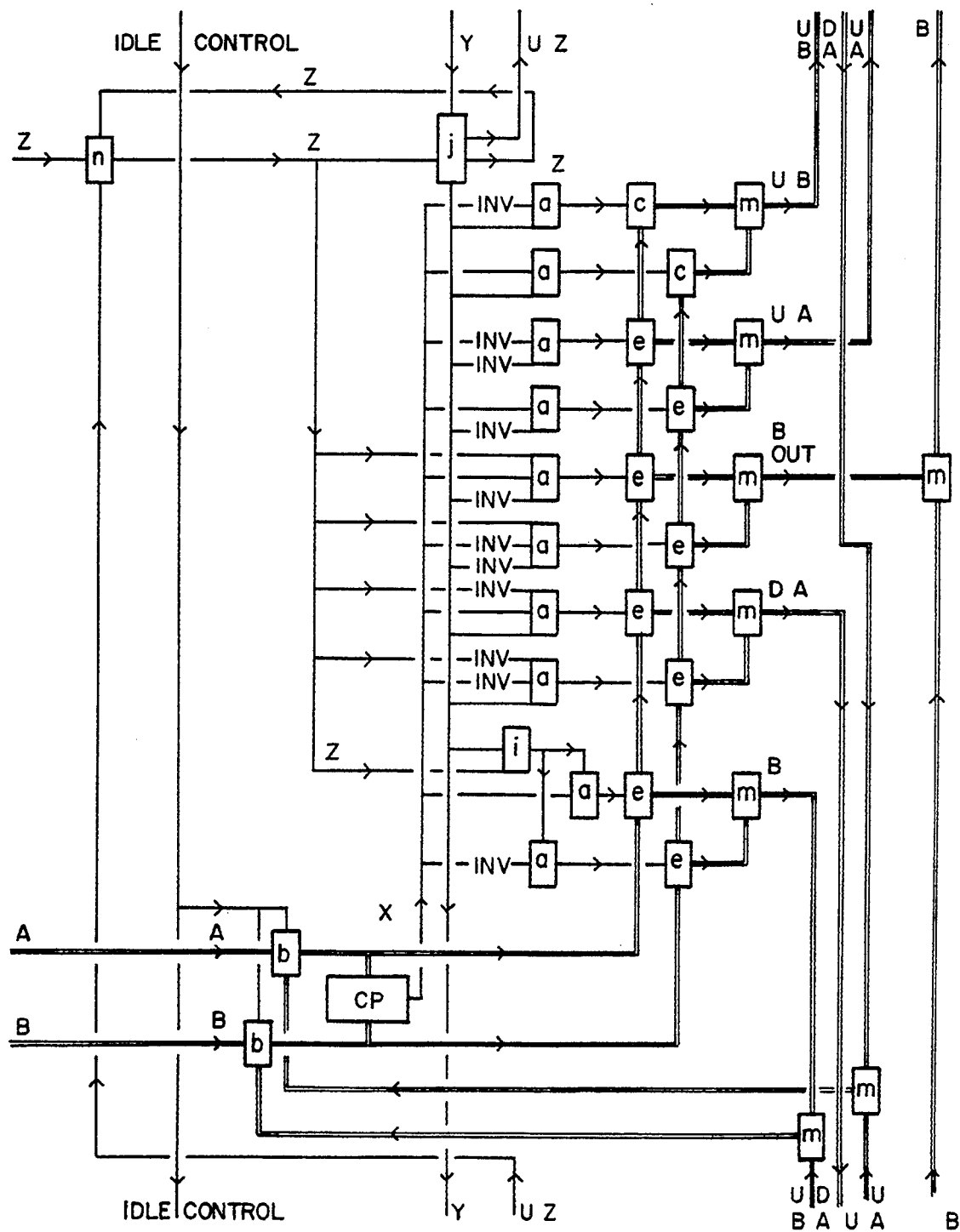
Figure 13A:
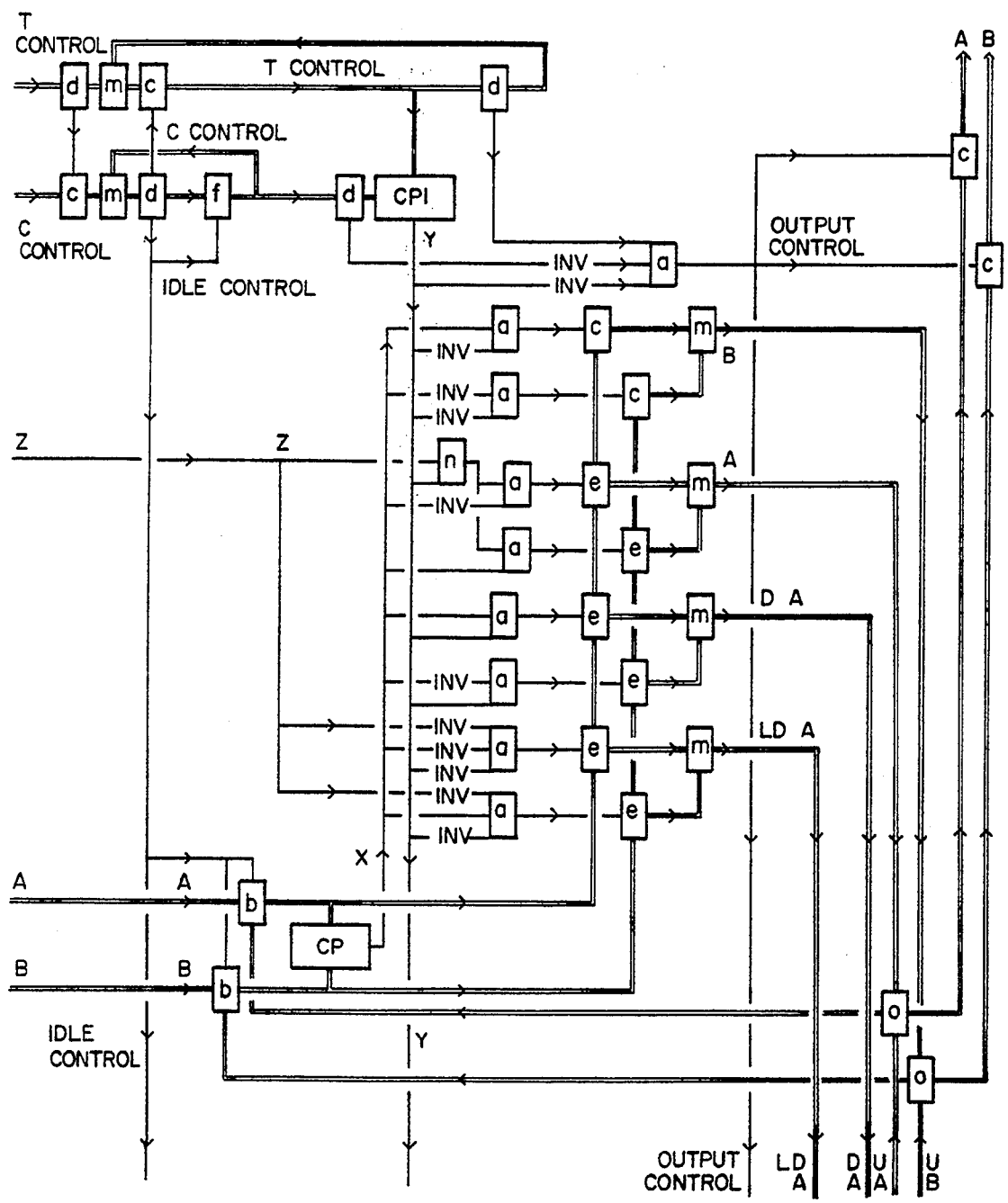
FIGS. 13A and 13B are circuit block diagrams of the third embodiment (Lin 3) of the invention configured according to a second method to output results all at once, namely Method D—Output only once.
Figure 13B:
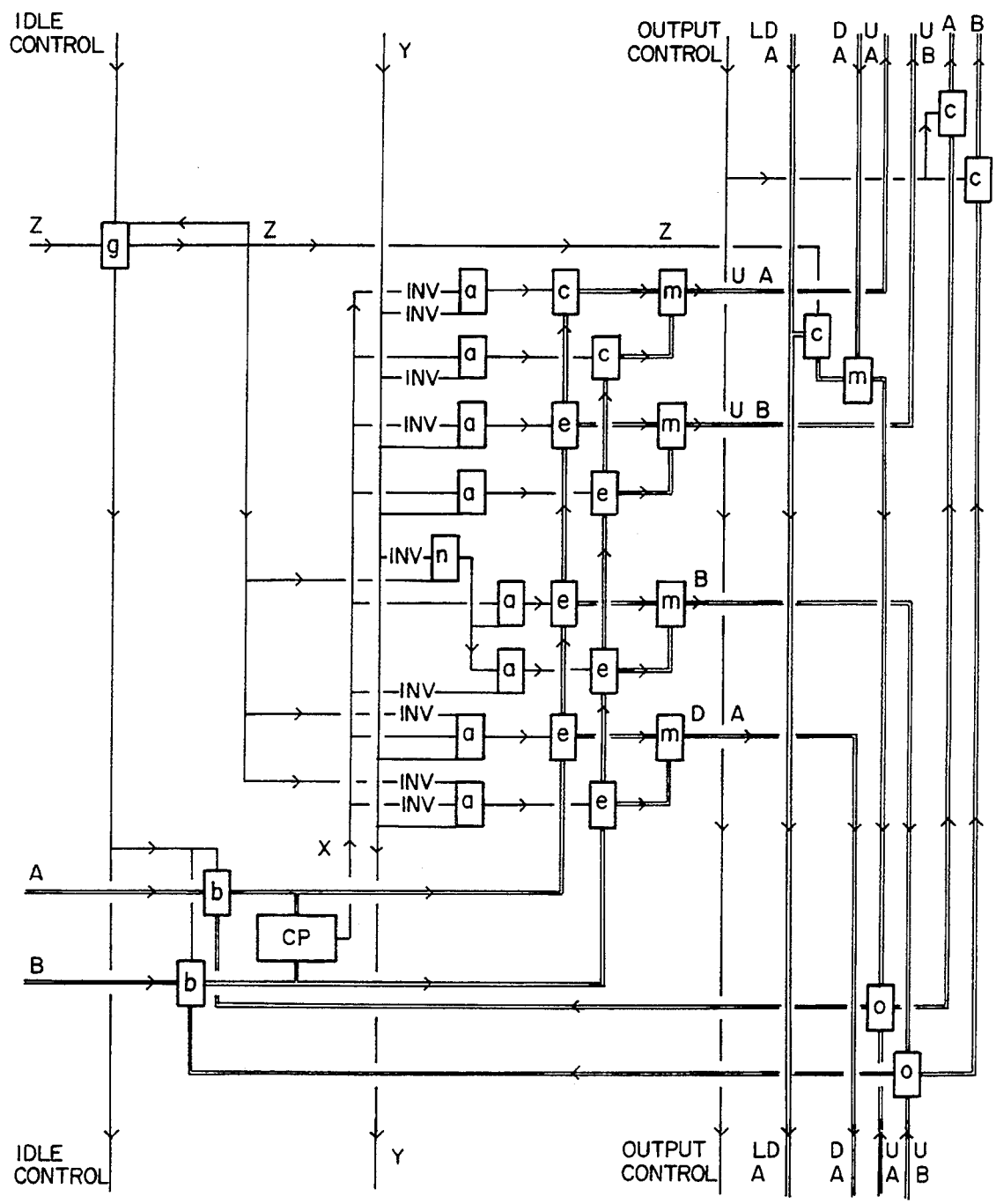

FIG. 5 illustrates a single element of the first and second embodiments. C-control 250 is decremented by 1 and is checked for a result of not less than T-control 258, less than T-control but greater than 0, or equal to 0. The result of signal combines the Z-control line 256 to controls the shifting movement as we illustrate above. A-key 251 and B-key 254 are compared and shifted along with their pointers 252 and 255 to the designated cells. Processor 253 combines the result of C-control, T-control and Z-control signals with the result of A, B keys comparison, then shifts keys and pointers to their proper location. Z-control line 256 signals the processor that this cell 257 is the last cell used. The cells below are idled.

The major difference between the first and second embodiments is that the second embodiment holds the data in the buffer until sort/merge is complete, then collects the whole data at one time. The first embodiment, on the other hand, collects the data pieces by pieces until the process stops.

The second embodiment may also be used procedurally in two ways. The first method is as follows:

Step 1—If C-control and T-control both are greater than 0 decrement C-control by 1. If C-control is not less than T-control, then:

For the first row of cells

Compare the keys A and B. The smaller key and its pointer will be moved to B-buffer at next cell, such as from cell 201 to cell 206. Another key and its pointer will be moved to B-Buffer at next down cell, such as cell 201 to cell 207.

For the second row of cells and down:

Compare the keys A and B. If Z-control is not on, then the smaller key and its pointer will be moved to A-buffer at next up cell such as from cell 202 to cell 206, and another key and its pointer will be moved to B-buffer at next down cell such as from cell 202 to cell 208. If Z-control is on, then the smaller key and its pointer will be moved to A-buffer at next up cell such as from cell 205 to cell 209, and another key and its pointer will be moved to A-buffer at next cell such as from cell 205 to cell 210.

Repeat step 1 process when C-control is not less than T-control.

Step 2—If both C-control and T-control are greater than 0, decrement C-control by 1. If C-control is less than T-control, then:

For the first row of cells:

Compare the keys A and B. The smaller key and its pointer will be moved to A-buffer of cell where its Z-control is on, such as from cell 221 to cell 230, and another key and its pointer will be moved to B-buffer at next cell, such as from cell 221 to cell 226.

For the second row of cells and down:

Compare the keys A and B. The smaller key and its pointer will be moved to A-buffer at next up cell such as from cell 222 to cell 226, and another key and its pointer will be moved to B-buffer at next cell such as from cell 222 to cell 227.

Repeat the step 2 until C-control is equal to 0.

As soon as C-control becomes 0, each cell will output keys A and B, their pointers, and Job Id at the same time. The data will be in ascending order from all data in A-output buffer and then all data in B-output buffer with the same Job Id. If the first data is null, it should be ignored.

Reset T-control and Z-control to 0.

Stop the process.

The second procedural method is as follows:

Step 1—If C-control and T-control are greater than 0, decrement C-control by 1. If C-control is not less than T-control, then:

For the first row of cells:

Compare the keys A and B. The smaller key and its pointer will be moved to A-buffer at next cell, such as from cell 201 to cell 206. Another key and its pointer will be moved to A-buffer at next down cell, such as from cell 201 to cell 207.

For the second row of cells and down:

Compare the keys A and B. If Z-control is not on, then the smaller key and its pointer will be moved to B-buffer at next up cell such as from cell 202 to cell 206, and another key and its pointer will be moved to A-buffer at next down cell such as from cell 202 to cell 208. If Z-control is on, then the smaller key and its pointer will be moved to B-buffer at next up cell such as from cell 205 to cell 209, and another key and its pointer will be moved to B-buffer at next cell such as from cell 205 to cell 210.

Repeat step 1 when C-control is not less than T-control.

Step 2—If C-control and T-control both are greater than 0, decrement C-control by 1. If C-control is less than T-control, then:

For the first row of cells:

Compare the keys A and B. The smaller key and its pointer will be moved to A buffer of cell where its Z-control is on, such as from cell 221 to cell 230, and another key and its pointer will be moved to B-buffer at next cell, such as from cell 221 to cell 226.

For the second row of cells and down:

Compare the keys A and B. The smaller key and its pointer will be moved to A-buffer at next up cell such as from cell 222 to cell 226, and another key and its pointer will be moved to B-buffer at next cell such as from cell 222 to cell 227.

Repeat the step 2 until C-control is equal to 0.

As soon as C-control becomes 0, each cell will output keys A and B, their pointers and Job Ids at the same time. The data will be in ascending order from all data in A-output buffer to all data in B-output buffer with same Job Id. If the first data is null, then it should be ignored.

Reset T-control and Z-control to 0.

Stop the process.

Third Embodiment

Figure 4:
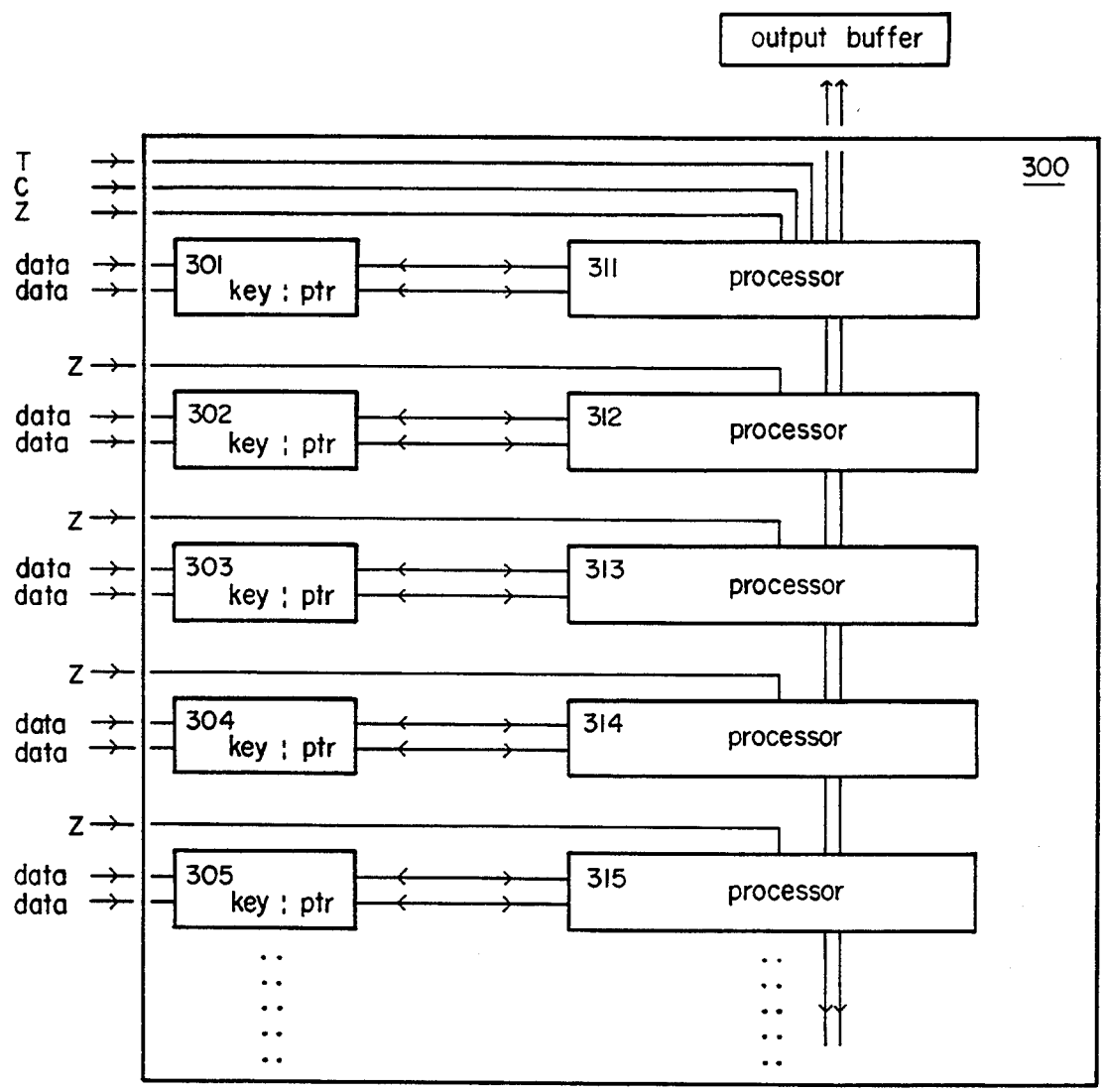
FIG. 4 illustrates the schematic structure of still another embodiment (Lin 3) of the invention.

The third embodiment 300, hereinafter sometimes referred to as Lin3, is a simple model of the first two embodiments. FIG. 4 shows an example of with a structure of 5 rows. This structure can be expanded to n rows as necessary. Each cell contains a processor, Z-control, and A, B key buffers and their pointers. A command is given to sort and/or merge file(s). The initial setup is same as Lin1 does. CPU 2 loads data from hard disk 7 or memory 5 into buffers 301–305 in pairs. The first two pieces of data are loaded in buffer 301 to A and B location associated with the value of 1 and 2 to their pointers, respectively; the next two pieces of data in buffer 302 to A and B location associated with the value of 3 and 4 to their pointers, respectively; and so on so forth until all the data are loaded in their proper positions. If a buffer contains only one piece of data, pair it with null value. Idle the buffer(s) which contain(s) no data. Set Z-control at cell 305 to be on, C-control to be n-1 which is 9, T-control to be n/2 which is 5. When the initial loading is complete, the sort/merge process begins. The process continues until C-control or T-control is equal to zero.

In the example, C-control is decremented by 1 to be 8 which is greater than T-control. So the smaller key at cell 301 is staying in 301 with its pointer, and the larger key is moved to cell 302 with its pointer. The smaller key at cell 302 is moved to cell 301 with its pointer, and the larger key is moved to cell 303 with its pointer. The smaller key at cell 303 is moved to cell 302 with its pointer, and the larger key is moved to cell 304 with its pointer. The smaller key at cell 304 is moved to cell 303 with its pointer, and the larger key is moved to cell 305 with its pointer. Because Z-control is on at cell 305, the smaller key at cell 305 is moved to cell 304 with its pointer, and the larger key is staying in cell 305 with its pointer. Z-control, C-control and T-control stay at the same location. At this stage, C-control is greater than T-control, no output is produced. System then goes to next cycle.

In next cycle, C-control is decremented by 1 to be 7 which is still greater than T-control. The smaller key at cell 301 is staying in cell 301 with its pointer, and the larger key is moved to cell 302 with its pointer. The smaller key at cell 302 is moved to cell 301 with its pointer, and the larger key is moved to cell 303 with its pointer. The smaller key at cell 303 is moved to cell 302 with its pointer, and the larger key is moved to cell 304 with its pointer. The smaller key at cell 304 is moved to cell 303 with its pointer, and the larger key is moved to cell 305 with its pointer. Because Z-control is on at cell 305, the smaller at cell 305 is moved to cell 304 with its pointer, and the larger key is moved to cell 305 with its pointer. Z-control, C-control and T-control stay. At this stage, C-control is greater than T-control, no output is produced. System then goes to next cycle.

Repeat the process until C-control is equal to 5. At this stage the third embodiment has two methods of handling the data output. One method is to output data piece by piece and another is to output data all in once.

With output data piece by piece method:

Now C-control is equal to 5, T-control is equal to 5, and Z-control at cell 305 is on. After decrementing C-control by 1, C-control is equal to 4 which is less than T-control, the output control is turned on. Because C-control is less than T-control, data shifting process is changed. The smaller key and its pointer at cell 301 is output to A output buffer, and the larger key is staying in cell 301 with its pointer. The smaller key at cell 302 is moved to cell 301 with its pointer, and the larger key is staying in cell 302 with its pointer. The smaller key at cell 303 is moved to cell 302 with its pointer, and the larger key is staying in cell 303 with its pointer. The smaller key at cell 304 is moved to cell 303 with its pointer, and the larger key is staying in cell 304 with its pointer. Because Z-control is on at cell 305, the smaller key at cell 305 is moved to cell 304 with its pointer, and the larger key and its pointer is output to B output buffer. Z-control at cell 304 is turned on. C-control and T-control stays. At this stage, C-control is not equal to zero, process continues.

After decrementing C-control by 1, C-control is equal to 3 which is less than T-control, the output control is turned on. The smaller key and its pointer at cell 301 is output to A output buffer, and the larger key is staying in cell 301 with its pointer. The smaller key at cell 302 is moved to cell 301 with its pointer, and the larger key is staying in cell 302 with its pointer. The smaller key at cell 303 is moved to cell 302 with its pointer, and the larger key is staying in cell 303 with its pointer. Because Z-control at cell 304 is on, the smaller key at cell 304 is moved to cell 303 with its pointer, and the larger key and its pointer is output to B output buffer. Z-control at cell 303 is turned on. C-control and T-control stay. At this stage, C-control is not equal to zero, process continues.

After decrementing C-control by 1, C-control is equal to 2 which is less than T-control, the output control is turned on. The smaller key and its pointer at cell 301 is output to A output buffer, and the larger key is staying in cell 301 with its pointer. The smaller key at cell 302 is moved to cell 301 with its pointer, and the larger key is staying in cell 302 with its pointer. The smaller key at cell 303 is moved to cell 302 with its pointer, and the larger key and its pointer is output to B output buffer. Z-control at cell 302 is turned on. C-control and T-control stay. At this stage, C-control is not equal to zero, process continues.

After decrementing C-control by 1, C-control is equal to 1 which is less than T-control, the output control is turned on. The smaller key and its pointer at cell 301 is output to A output buffer, and the larger key is staying in cell 301 with its pointer. The smaller key at cell 302 is moved to cell 301 with its pointer, and the larger key and its pointer is output to B output buffer. Z-control at cell 301 is turned on. C-control and T-control stay. At this stage, C-control is not equal to zero, process continues.

After decrementing C-control by 1, C-control is equal to 0 which is less than T-control, the output control is turned on. The smaller key and its pointer at cell 301 is output to A output buffer, and the larger key and its pointer is output to B output buffer. All Z-control are off. C-control and T-control stay. At this stage, C-control is equal to zero, it turns off T-control and process stops.

With output data all in once method:

At this stage C-control is equal to 5, T-control is equal to 5, and Z-control at cell 305 is on. After decrementing C-control by 1, C-control is still greater than 0, the output control is off. Because C-control is less than T-control, data shifting process is changed. The smaller key and its pointer at cell 301 is moved to cell 305 with its pointer because Z-control at cell 305 is on, and the larger key is staying in cell 301 with its pointer. The smaller key at cell 302 is moved to cell 301 with its pointer, and the larger key is staying in cell 302 with its pointer. The smaller key at cell 303 is moved to cell 302 with its pointer, and the larger key is staying in cell 303 with its pointer. The smaller key at cell 304 is moved to cell 303 with its pointer, and the larger key is staying in cell 304 with its pointer. The smaller key at cell 305 is moved to cell 304 with its pointer, and the larger key and its pointer is staying in cell 305 with its pointer. Z-control, C-control and T-control remain in the same location. At this stage, C-control is not equal to zero, process continues.

After decrementing C-control by 1, C-control is equal to 3 which is greater than 0, the output control is off. The smaller key and its pointer at cell 301 is moved to cell 305 with its pointer because Z-control at cell 305 is on, and the larger key is staying in cell 301 with its pointer. The smaller key at cell 302 is moved to cell 301 with its pointer, and the larger key is staying in cell 302 with its pointer. The smaller key at cell 303 is moved to cell 302 with its pointer, and the larger key is staying in cell 303 with its pointer. The smaller key at cell 304 is moved to cell 303 with its pointer, and the larger key and its pointer is staying in cell 304 with its pointer. The smaller key at cell 305 is moved to cell 304 with its pointer, and the larger key and its pointer is staying in cell 305 with its pointer. Z-control, C-control and T-control stay. At this stage, C-control is not equal to zero, process continues.

After decrementing C-control by 1, C-control is equal to 2 which is greater 0, the output control is off. The smaller key and its pointer at cell 301 is moved to cell 305 with its pointer because Z-control at cell 305 is on, and the larger key is staying in cell 301 with its pointer. The smaller key at cell 302 is moved to cell 301 with its pointer, and the larger key is staying in cell 302 with its pointer. The smaller key at cell 303 is moved to cell 302 with its pointer, and the larger key is staying in cell 303 with its pointer. The smaller key at cell 304 is moved to cell 303 with its pointer, and the larger key and its pointer is staying in cell 304 with its pointer. The smaller key at cell 305 is moved to cell 304 with its pointer, and the larger key and its pointer is staying in cell 305 with its pointer. Z-control, C-control and T-control stay. At this stage, C-control is not equal to zero, process continues.

After decrementing C-control by 1, C-control is equal to 1 which is still greater than 0, the output control is off. The smaller key and its pointer at cell 301 is moved to cell 305 with its pointer because Z-control at cell 305 is on, and the larger key is staying in cell 301 with its pointer. The smaller key at cell 302 is moved to cell 301 with its pointer, and the larger key is staying in cell 302 with its pointer. The smaller key at cell 303 is moved to cell 302 with its pointer, and the larger key is staying in cell 303 with its pointer. The smaller key at cell 304 is moved to cell 303 with its pointer, and the larger key and its pointer is staying in cell 304 with its pointer. The smaller key at cell 305 is moved to cell 304 with its pointer, and the larger key and its pointer is staying in cell 305 with its pointer. Z-control, C-control and T-control stay. At this stage, C-control is not equal to zero, process continues.

After decrementing C-control by 1, C-control is equal to 0 which is less than T-control and T-control is greater than 0, the output control is turned on. The smaller key and its pointer at cell 301 is moved to cell 305 with its pointer because Z-control at cell 305 is on, and the larger key is staying in cell 301 with its pointer. The smaller key at cell 302 is moved to cell 301 with its pointer, and the larger key is staying in cell 302 with its pointer. The smaller key at cell 303 is moved to cell 302 with its pointer, and the larger key is staying in cell 303 with its pointer. The smaller key at cell 304 is moved to cell 303 with its pointer, and the larger key and its pointer is staying in cell 304 with its pointer. The smaller key at cell 305 is moved to cell 304 with its pointer, and the larger key and its pointer is staying in cell 305 with its pointer. Because output control is on, the smaller keys and their pointers at cell 301, 302, 303, 304, 305 are output to A output buffer in ascending order, while the larger keys and their pointers at cell 301, 302, 303, 304, 305 are output to B output buffer in ascending order. At this stage, C-control is equal to zero, process stops. The output data sequence is in ascending order in A output buffer and continued to B output buffer in ascending order.

The third embodiment 300 processes one job at a time, which is suitable for mini-computers, PC workstations, or microcomputers. However, multiple sort processors built according to the principles of the third embodiment can be provided for the purpose of parallel processing.

The third embodiment has several procedural methods of use. They are:

Third embodiment, method C, output piece by piece procedure:

Step 1—If C-control and T-control both are greater than 0, decrement C-control by 1. If C-control is not less than T-control, then:

For the first cell row

Compare the keys A and B. The smaller key and its pointer will be moved to B-buffer at current cell, and another key and its pointer will be moved to B-buffer at next down cell such as from cell 301 to cell 302.

For the second cell row and down:

Compare the keys A and B. If Z-control is not on, then the smaller key and its pointer will be moved to A-buffer at next up cell such as from cell 302 to cell 301, and another key and its pointer will be moved to B-buffer at next down cell such as from cell 302 to cell 303. If Z-control is on in the current cell, then the smaller key and its pointer will be moved to A-buffer at next up cell such as from cell 305 to cell 304, and another key and its pointer will be moved to A-buffer at current cell.

Repeat step 1 process when C-control is not less than T-control.

Step 2—If both C-control and T-control are greater than 0, decrement C-control by 1. If C-control is less than T-control, then:

For the first cell row:

Compare the keys A and B. The smaller key and its pointer will output to A-output buffer, and another key and its pointer will be moved to B-buffer at current cell. If Z-control is on, then the smaller key and its pointer are output to A-output buffer and the larger key and its pointer are output to B-output buffer.

For the second cell row and down:

Compare the keys A and B, if Z-control is not on, then the smaller key and its pointer will be moved to A-buffer at next up cell such as from cell 302 to cell 301, and another key and its pointer will be moved to B-buffer at current cell. If Z-control on in cell 305, then the smaller key and its pointer will be moved to A-buffer at next up cell such as from cell 305 to cell 304, and another key and its pointer will output to B-output buffer.

Repeat the step 2 until C-control is equal to 0, where C-control will then reset T-control to 0. Z-control is all off. Process stops.

To output the data, the smaller key is output by A-output data line and another key is output by B-output data line. The output sequence will in ascending order of in A-output buffer and then the reverse order in B-output buffers, because this method outputs the smallest and the largest value, the second smallest and second largest value, . . . to the least smallest and the least largest value. If the first data contains null value, then it should be ignored.

Third embodiment, Method D, output piece by piece procedure:

Step 1—If C-control and T-control both are greater than 0, decrement C-control by 1. If C-control is not less than T-control, then:

For the first row of cell:

Compare the keys A and B. The smaller key and its pointer will be moved to A-buffer at current cell, and another key and its pointer will be moved to A-buffer at next down cell, such as cell 301 to cell 302.

For the second row of cell and down:

Compare the keys A and B. If Z-control is not on, then the smaller key and its pointer will be moved to B-buffer at next up cell such as from cell 302 to cell 301, and another key and its pointer will be moved to A-buffer at next down cell such as from cell 302 to cell 303. If Z-control is on in the current cell, then the smaller key and its pointer will be moved to B-buffer at next up cell such as from cell 305 to cell 304, and another key and its pointer will be moved to B-buffer at current cell.

Repeat step 1 when C-control is not less than T-control.

Step 2—If C-control and T-control both are greater than 0, decrement C-control by 1. If C-control is less than T-control, then:

For the first cell row:

Compare the keys A and B. The smaller key and its pointer will output to A-output buffer, and another key and its pointer will be moved to B-buffer at current cell. If Z-control is on, then the smaller key and its pointer are output to A-output buffer, and the larger key and its pointer are output to B-output buffer.

For the second cell row and down:

Compare the keys A and B. If Z-control is not on, then the smaller key and its pointer will be moved to A-buffer at next up cell such as from cell 302 to cell 301, and another key and its pointer will be moved to B-buffer at current cell. If Z-control is on at current cell, then the smaller key and its pointer will be moved to A-buffer at next up cell such as from cell 305 to cell 304, and another key and its pointer will output to B-output buffer.

Repeat the step 2 until count is equal to 0, where C-control will reset T-control to 0. Z-control is all off. Process stops. To output the data, the smaller key is output by A-output data line and another key is output by B-output data line.

The output sequence will in ascending order in A-output buffer and then the reverse order in B-output buffer, because this method outputs the smallest and the largest value, the second smallest and second largest value, ... to the least smallest and the least largest value. If the first data contains null value, then it should be ignored.

Third embodiment, method C, output only once procedure:

Step 1—If C-control and T-control both are greater than 0, decrement C-control by 1. If C-control is not less than T-control, then:

For the first cell row

Compare the keys A and B. The smaller key and its pointer will be moved to B-buffer at current cell, and another key and its pointer will be moved to B-buffer at next down cell, such as cell 301 to cell 302.

For the second cell row and down:

Compare the keys A and B. If Z-control is not on, then the smaller key and its pointer will be moved to A-buffer at next up cell such as from cell 302 to cell 301, and another key and its pointer will be moved to B-buffer at next down cell such as from cell 302 to cell 303. If Z-control is on at current cell, then the smaller key and its pointer will be moved to A-buffer at next up cell such as from cell 305 to cell 304, and another key and its pointer will be moved to A-buffer at current cell.

Repeat step 1 process when C-control is not less than T-control.

Step 2—If both C-control and T-control are greater than 0, decrement C-control by 1. If C-control is less than T-control, then:

For the first cell row:

Compare the keys A and B. The smaller key and its pointer will be moved to A-buffer of cell where its Z-control is on, such as from cell 301 to cell 305, and another key and its pointer will be moved to B-buffer at current cell.

For the second cell row and down:

Compare the keys A and B. The smaller key and its pointer will be moved to A-buffer at next up cell such as from cell 302 to cell 301, and another key and its pointer will be moved to B-buffer at current cell.

Repeat the step 2 until C-control is equal to 0.

As soon as C-control becomes 0, each cell will output keys A and B and their pointers at the same time. The data will be in ascending order from all data in A-output buffer and then all data in B-output buffer. If the first data is null, it should be ignored.

Reset T-control and Z-control to 0.

Stop the process.

Third embodiment, method D, output only once procedure:

Step 1—If C-control and T-control both are greater than 0, decrement C-control by 1. If C-control is not less than T-control, then:

For the first cell row:

Compare the keys A and B. The smaller key and its pointer will be moved to A-buffer at current cell, and another key and its pointer will be moved to A-buffer at next down cell, such as from cell 301 to cell 302.

For the second cell row and down:

Compare the keys A and B. If Z-control is not on, then the smaller key and its pointer will be moved to B-buffer at next up cell such as from cell 302 to cell 301, and another key and its pointer will be moved to A-buffer at next down cell such as from cell 302 to cell 303. If Z-control is on at current cell, then the smaller key and its pointer will be moved to B-buffer at next up cell such as from cell 305 to cell 304, and another key and its pointer will be moved to B-buffer at current cell.

Repeat step 1 when C-control is not less than T-control.

Step 2—If C-control and T-control both are greater than 0, decrement C-control by 1. If C-control is less than T-control, then:

For the first row of cell:

Compare the keys A and B. The smaller key and its pointer will be moved to A-buffer of cell where its Z-control is on such as from cell 301 to cell 305, and another key and its pointer will be moved to B-buffer at current cell.

For the second row of cell and down:

Compare the keys A and B. The smaller key and its pointer will be moved to A-buffer at next up cell such as from cell 302 to cell 301, and another key and its pointer will be moved to B-buffer at current cell.

Repeat the step 2 until C-control is equal to 0.

As soon as C-control becomes 0, each cell will output keys A and B and their pointers at the same time. The data will be in ascending order from all data in A-output buffer and then all data in B-output buffer. If the first data is null, it should be ignored.

Reset T-control and Z-control to 0.

Stop the process.

FIGS. 6A, 6B, 6C, 7A, 7B, 7C, 8A, 8B, 8C, 9A, 9B, 9C, 10A, 10B, 11A, 11B, 12A, 12B, 13A, 13B, 14A and 14B illustrate detailed cell structures of the various embodiments. The following information will be helpful in understanding these figures.

>

This indicates data flow from left to right which contains more than one bit of information. Data is null If every bit information is 0 or inactive.

>

This indicates control flow from left to right. If control is 0 means inactive. If control is 1 means active. This contains only one bit of information.

INV >

This indicates control flow from left to right with invertor which means signal is changed from 0 to 1 or from 1 to 0.

AND operation means that if and only if all input signals are active, then the output signal will be active, unless otherwise the output signal will be inactive.

OR operation means that if any input signal is active, then the output signal will be active, unless otherwise the output signal will be inactive.

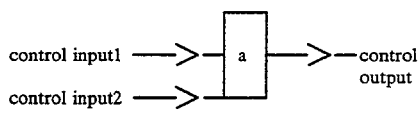

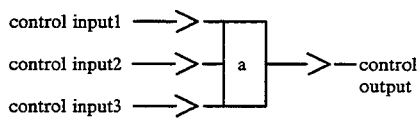

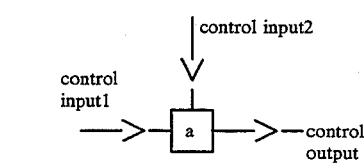

Control output is active only if control input1, control input2 and control input3 (if control input3 exists) are active. Otherwise control output is inactive.

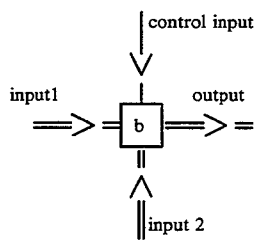

If control input is active, output is the result of OR operation of input1 and input2. Otherwise, output is null.

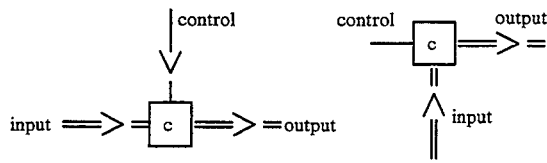

If control is inactive, output is null. Output is same as input if control is active.

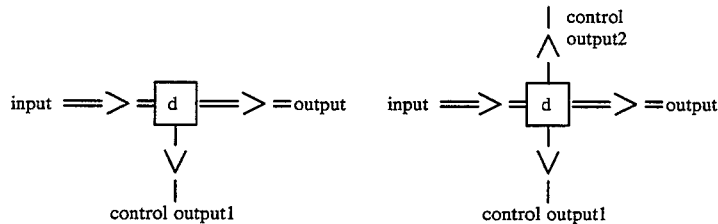

Control output1 is the result of OR operation of input bits information which means control output1 is active if input is not null. If control output2 is needed, then control output2 is same as control output1. Output is always same as input.

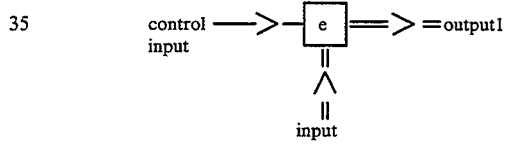

If control input is active, then output1 is same as input. Otherwise output1 becomes null. Output2 is always same as input.

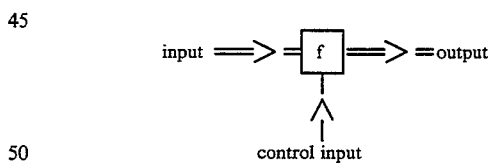

If control input is active, output is equal to input minus 1. Otherwise output is null.

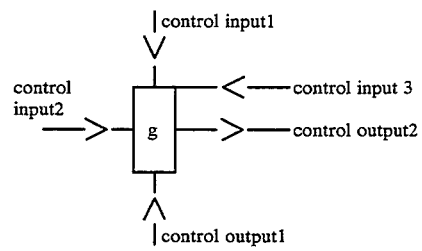

Control output1 is always same as control input1. If control input1 is inactive, then control output2 is inactive. If control input1 is active, then control output2 is the result of OR operation of control input2 and control input3.

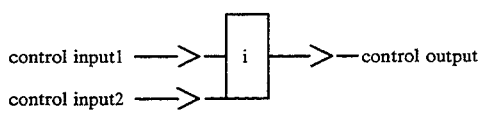

If control input1 and control input2 are both active or both inactive, control output is active. Otherwise control output is inactive.

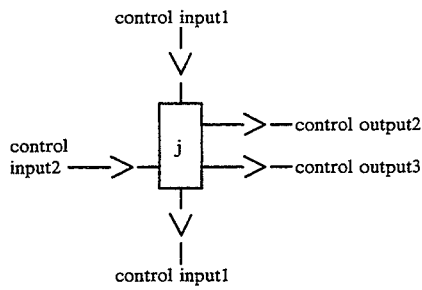

Control output1 is always same as control input1. Control output3 is the result of AND operation of control input1 and control input2. Control output2 is the result of AND operation of control input1 with invertor and control input2.

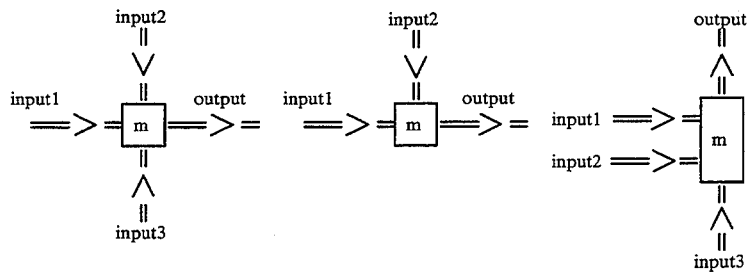

Output is the result of OR operation of input1, input2 and input3 (if input3 is needed). If only two inputs, then output is the result of OR operation of these two inputs.

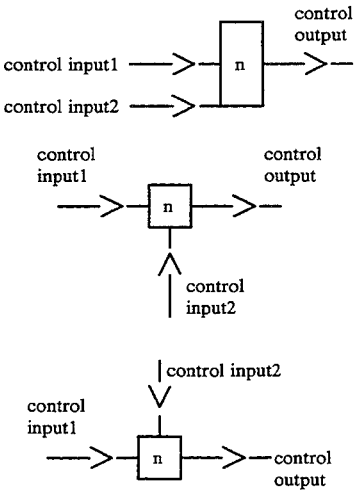

Control output is active if either control input1 or control input2 is active. Otherwise control output is inactive.

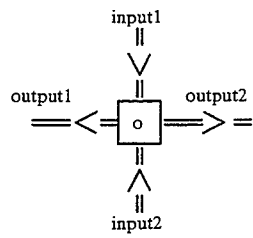

Output1 is same as output2. Output2 is the result of OR operation of input1 and input2.

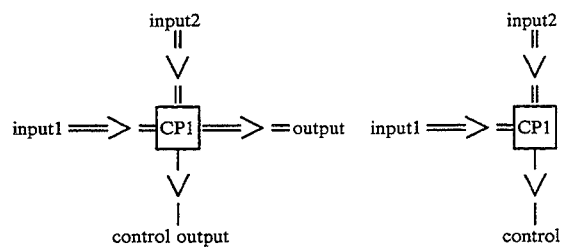

Control output is active if input1 is not less than input2. Otherwise control output is inactive. If output is needed, then output is same as input1.

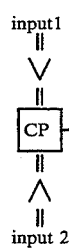

Control output is active if input1 is not less than input2. Otherwise control output is inactive.

Figure 14A:
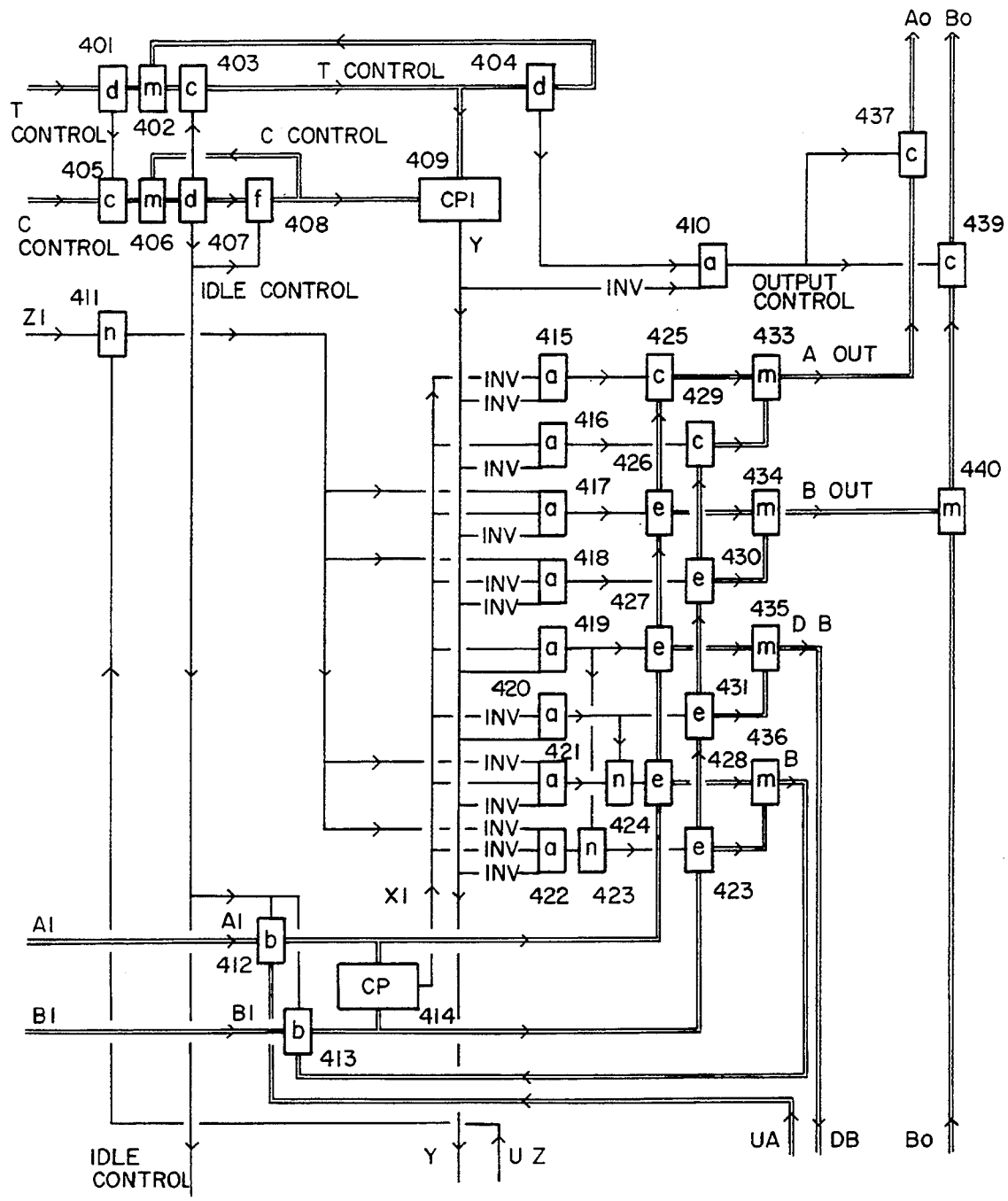
FIGS. 14A and 14B are the circuit block diagrams of FIGS. 10A and 10B with reference numerals for clarity.
Figure 14B:
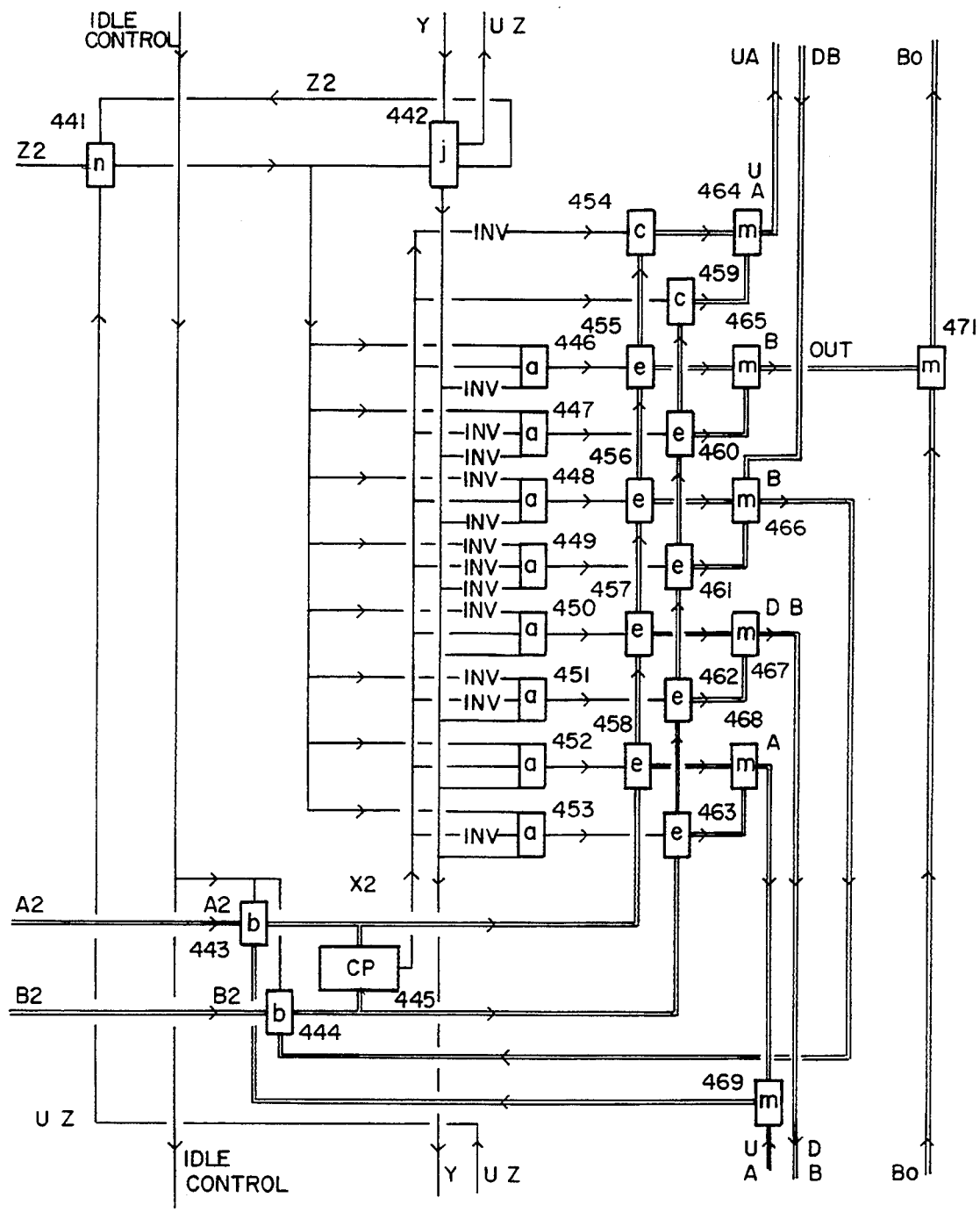

FIGS. 14A and 14B best illustrate the interaction between elements within a cell structure. In FIGS. 14A and 14B, A and B are data to be sorted. Z is a control signal indicating that these two pieces of data are the last pair of data to be sorted. If the last pair has only one element, pair it with null value. Data move from left to right follows the arrow. T-CONTROL is the total number of pairs. C-CONTROL is the total number of elements, includes the null value, minus one. C-CONTROL controls number of times data been processed. If either T-CONTROL and C-CONTROL is equal to 0, OUTPUT-CONTROL will become inactive and process will stop. The result of comparison between C-CONTROL and T-CONTROL is called Y. Y is off if C-CONTROL is less than T-CONTROL. The result of A and B comparison is called X. X is off if A is less than B. X, Y and Z control data flow.

In FIGS. 14A and 14B, assume there are four numbers (95, 92, 91, 99) to be sorted. Let n=4, T-CONTROL=2, C-CONTROL=3, Z1=null, A1=95, A1 pointer=1, B1=92, B1 pointer=2, Z2=1, A2=91, A2 pointer=3, B2=99, and B2 pointer=4. In the following context, merge means OR operation and control means AND operation. After the preload process is done, the sorting proceeds. Because T-CONTROL>0, it sends a control from 401 to 405 to signal C-CONTROL data may flow from 405 to 406. T-CONTROL then merges at 402 with circulated T CONTROL which is 0 and flow to 403. At 406 C-CONTROL merges with circulated C CONTROL which is 0 and flow to 407. At this moment T-CONTROL is still equal to 2 and C-CONTROL is equal 3. Because C-CONTROL is greater than 0, it sends one control up to 403 to signal T-CONTROL may flow out from 403 and another control called IDLE CONTROL down to 412, 413, 443, 444 to signal A1, B1, A2, B2 may pass. At 408 C-CONTROL is then decremented by 1 which becomes 2. Meanwhile, Data 95 is merged at 412 with null value UA. So A1=95, A1 pointer=1, Data 92 is merged at 413 with null value B. So B1=92 and B1 pointer=2. Data 91 is merged at 443 with data merging from A and UA at 469. So A2=91 and A2 pointer=3. Data 99 is merged at 444 with null value from 466. So B2=99 and B2 pointer=4. In the mean time, Z1 is merged at 411 with UZ from 442 which is null. So Z1 is null. Z2 is merged at 441 with Z2 from 442. So Z2=1. At this stage, T-CONTROL=2, C-CONTROL=2, A1=95, A1 pointer=1, B1=92, B1 pointer=2, A2=91, A2 pointer=3, B2=99, B2 pointer=4, Z1=null, and Z2=1. At 409 because T-CONTROL is equal to C-CONTROL, Y=1. At 414 because A1 is greater than B1, X1=1. At 445 because A2 is less than B2, X2=null. Since X1=1, Y=1 and Z1=null, only signal at 419=1. At 423 a control is merged with signal from 419 and 422, where 419 is 1 and 422 is null. So 423=1. A1 and its pointer are flowing through 428 to 425 and B1 and its pointer are flowing through 432 to 429. Since only 419 and 423 are equal to 1, data 95 and pointer value 1 are flowing out from 427 and data 92 and pointer value 2 is flowing out from 432. Data 95 is then merged with null value from 431 at 435 and still be data 95 with pointer value of 1. Data 92 is merged with null value from 428 at 436 and still be data 92 with pointer value of 2. Meanwhile, because X2=null, Y=1 and Z2=1, only 453 and 454 are equal to 1 and the rests are null. Data 91 with its pointer value of 3 is flowing out from 454 and data 99 with it pointer value of 4 is flowing out from 463. Data 91 is then merged with null value from 459 at 464. Data 99 is merged with null value from 458 at 468. Data 95 flowing from 435 to merge with null value at 466 and goes back to 444 merging with null value B2. B2=95 and B2 pointer=1. Data 92 flowing from 436 to 413 and is merged with null value B1. B1=92 and B1 pointer=2. Data 91 flowing out from 464 to 412 is merged with null value A1. A1=91 and A1 pointer=3. Data 99 flowing out from 468 is merged at 469 with null value from UA one cell down and then merged with null value A2 at 443. A2=99 and A2 pointer=4. Z2 from 441 is now controlled by Y. Y=1, so Z2 from 442 back to 441 is still be 1, and UZ from 442 to 411 is null. Z1=null. Z2=1. For OUTPUT-CONTROL, because Y=1, its inverse is null. So OUTPUT CONTROL=null and no outputs will be available at 437 and 439. So at this stage, A1=91, A1 pointer=3, B1=92, B1 pointer=2, A2=99, A2 pointer=4, B2=95, B2 pointer=1, Z1=null, Z2=1, T-CONTROL=2, C-CONTROL=2. No output is produced. The second step repeats the previous process. Because there is no preload at this stage, all incoming value are null. C-CONTROL from 408 is equal to 2 and is merged with null value from 405 at 406. Because C-CONTROL=2, it sends a control signal to 403 to let T-CONTROL pass by and also turns on IDLE CONTROL to let A1, B1, A2 and B2 be ready for process. T-CONTROL from 404 is equal to 2 and is merged with null value from 401 at 402. T-CONTROL=2. C-CONTROL is decremented by 1 at 408. So C-CONTROL=1. At 409, C-CONTROL is less than T-CONTROL, Y is null. Z1 is null at 411. Z2=1 at 441. Because A1 is less than B1, X1 is null. A2 is greater than B2, X2=1. Therefore, only 415, 422, 446 and 459 are not null. Data 91 with its pointer value of 3 is flowing to 433 from 425 and merged with null value from 429 at 433. Because T-CONTROL=2 and Y=null, OUTPUT-CONTROL is equal to 1. Therefore data 91 with its pointer value of 3 is output from 437 to Ao output buffer to be the smallest value. Because control from 422 is equal to 1, control from 423 is also equal to 1. Data 92 with its pointer value of 2 is signaled to flown out from 432 to 436 and merged with null value from 428 at 436. Data 92 with its pointer value of 2 is then flowing back to 413 to merged with null value B1. B1=92 and B1 pointer=2. Meanwhile, at 459, X2 signals B2 to flow out to 464 and merged with null value from 454. Data 95 with its pointer value flows from 464 to merge with null value at 412. A1=95 and A1 pointer=1. At 455, A2 is signaled by control from 446 to flow to 465 to merge with null value from 460. Data 99 with its pointer value of 4 is then merged with null value at 471 from Bo of the third cell. Then data 99 is merged with null value from 434 at 440. Data 99 with its pointer value of 4 is output from 439 by OUTPUT-CONTROL via Bo at the second cell. So 99 is the largest value. At 442, Y is null, so Z2 value to 441 becomes null and UZ value to 411 becomes 1. Therefore, A1=95, A1 pointer=1, B1=92, B1 pointer=2, A2=null, B2=null, Z1=1, Z2=null, C-CONTROL=1, T-CONTROL=2.

The third step repeats the second step as well. Since A2, B2 and Z2 are null, we can ignore the process of second cell and blow. C-CONTROL=1 and is merged with null value from 405 at 406. At 407 it sends a control to 403 to let T-CONTROL to flow from 403 to 404 and to let A1 and B1 to flow through from 412 and 413. At 408 C-CONTROL is decremented by 1. C-CONTROL=0. Because C-CONTROL is less than T-CONTROL, Y is null and OUTPUT-CONTROL =1. Because A1 is greater than B1, X1 is equal to 1. Z1 =1. So only 416 and 417 are equal to 1. A control from 416 to 429 signals B1 and its pointer to flow out from 429 to 433. Data 92 is merged with null value from 425 and flows to 437. Because OUTPUT-CONTROL=1, data 92 with its pointer value of 2 is output to Ao from the first cell to be the second smallest value. A control from 417 to 426 signals A1 and its pointer to flow from 426 to 434. Data 95 is merged with null value from 430 and flows to 440. Data 95 is then merged with null value from 471 at 440 and flows to 439. Then OUTPUT-CONTROL signals Data 95 and its pointer value of 1 to output to Bo from the first cell to be the second largest value. At this moment, C-CONTROL=0, T-CONTROL=2, A1=null, B1=null, A2=null, B2=null, Z1=null, Z2=null. Output sequence are the pairs of (91 with pointer value 3, 99 with pointer value 4), (92 with pointer value 2, 95 with pointer value 1). Because C-CONTROL is equal to 0, at 407 C-CONTROL will send a control to initialize T-CONTROL at 403, C-CONTROL at 408, A1 at 412, B1 at 413, A2 at 443, B2 at 444 to be null value. Because T-CONTROL becomes 0, OUTPUT-CONTROL at 410 will always be null value.

There is no more input, sort and output activities in the process. The result of the process is the exact order coming from Ao output buffer which is 91, 92 and reverse order coming from Bo output buffer which is 95, 99. Their pointer value provide additional information such as record number to sequence the data file.

It is understood that the above-described embodiment is merely illustrative of the application. Other embodiments may be readily devised by those skilled in the art which will embody the principles of the invention and fall within the spirit and scope thereof.

I claim:

1. In a data processing system including storage means, a central processor unit and a sorting machine having two control buffers holding data representing parameters selected for a data processing operation, a job identification control buffer, and a plurality of cells in a matrix comprised of a plurality of rows and columns of cells, said matrix having a first row defined as the top row and a last row defined as the bottom row, with direction in the matrix being defined as up being toward the top row, down being toward the bottom row, and from left to right within a row where a next cell is defined as one cell to the right and where a top cell is a cell corresponding to the first row and column, each said cell containing two key buffers holding data used for a sort/merge basis, two pointer buffers holding data defining an original sequence order for key data, a control register for indicating the last valid key to be sorted, and a processor for logically comparing pairs of data entities being sorted and for determining future cell directions, a process of sorting/merging data by said data processing system comprising the steps of:

defining each key buffer within a pair of key buffers as an A key and a B key;

defining each pointer buffer within a pair of pointer buffers as an A pointer and a B pointer;

defining A key and A pointer of a cell as A-buffer;

defining B key and B pointer of a cell as B-buffer;

defining a portion of said storage means to hold sorted/merged data wherein the portion is divided into A-output buffer and B-output buffer;

loading key and pointer data into a buffer in the sorting machine in sequence order, where key data is defined as data used for the sorting/merging basis, and where pointer data is defined as a sequence order key extracted from a file;

loading key and pointer data from said file that loads a pair of keys into key buffers of a cell and from the top cell down associated with a first pointer incremented by 1 to the last valid key;

loading a null value as a key and the null value as a pointer to pair the last valid cell, if the last valid cell has only one set of key and pointer;

using an additional control line to indicate the last valid cell of a column used and control a shifting process;

defining a number of keys to be sorted as C-control;

defining a number of cells as T-control, where the number of cells is equal to one-half the number of keys;

defining a signal of the additional control line that indicates a last valid cell in a column as Z-control;

comparing the two keys of each buffer wherein said comparing is comprised of:

performing the following step 1 beginning with the top cell:

decrement C-control by 1 when C-control and T-control are both greater than zero; and if C-control is not less than T-control, then do the following:

for the first row of cells compare the keys A and B and move the smaller key and its pointer to B-buffer of the next cell;

move the larger key and its pointer to the B-buffer of the next down cell;

for the second row of cells and down 1 compare the keys A and B, move the smaller key and its pointer to the A-buffer at the next up cell, and move the larger key and its pointer to the B-buffer at the next down cell if Z-control is not on;

unless otherwise, if Z-control is on, move the larger key and its pointer to the A-buffer at the next cell;

repeating the above step 1 process, after moving down a cell, until C-control is less than T-control;

performing the following step 2 beginning with the first cell of the second column;

decrement C-control by 1 when C-control and T-control are both greater than zero; and for the first row of cells compare the keys A and B and output the smaller key and its pointer to A, output buffer, and move the larger key and its pointer to the B-buffer of the next cell if Z-control is not on;

unless otherwise, if Z-control is on, output the larger key and its pointer to B-output buffer;

for the second row of cells and down compare the keys A and B, move the smaller key and its pointer to the A-buffer at the next up cell, and move the larger key and its pointer to the B-buffer at the next cell if Z-control is not on;

unless otherwise, if Z-control is on, output the larger key and its pointer to the B-output buffer;

repeating the above step 2 process, after moving down a cell, until C-control is equal to zero, where C-control resets T-control to zero; and Z-control is set to zero; and stopping the process when either C-control or T-control is zero, wherein the sorted/merged data is stored in the output buffers such that A-output buffer contains the smaller value in ascending order and the B-output buffer contains the larger values in descending order.

2. In a data processing system including storage means, a central processor unit and a sorting machine having two control buffers holding data representing parameters selected for a data processing operation, a job identification control buffer, and a plurality of cells in a matrix comprised of a plurality of rows and columns of cells, said matrix having a first row defined as the top row and a last row defined as the bottom row, with direction in the matrix being defined as up being toward the top row, down being toward the bottom row, and from left to right within a row where a next cell is defined as one cell to the right and where a top cell is a cell corresponding to the first row and column, each said cell containing two key buffers holding data used for a sort/merge basis, two pointer buffers holding data defining an original sequence order for key data, a control register for indicating the last valid key to be sorted, and a processor for logically comparing pairs of data entities being sorted and for determining future cell directions, a process of sorting/merging data by said data processing system comprising the steps of:

defining each key buffer within a pair of key buffers as an A key and a B key;

defining each pointer buffer within a pair of pointer buffers as an A pointer and a B pointer;

defining A key and A pointer of a cell as A-buffer;

defining B key and B pointer of a cell as B-buffer;

defining a portion of said storage means to hold sorted/merged data wherein the portion is divided into A-output buffer and B-output buffer;

loading key and pointer data into a buffer in the sorting machine in sequence order, where key data is defined as data used for the sorting/merging basis, and where pointer data is defined as a sequence order key extracted from a file;

loading key and pointer data from said file that loads a pair of keys into key buffers of a cell and from the top cell down associated with a first pointer incremented by 1 to the last valid key;

loading a null value as a key and the null value as a pointer to pair the last valid cell, if the last valid cell has only one set of key and pointer;

using an additional control line to indicate the last valid cell of a column used and control a shifting process;

defining a number of keys to be sorted as C-control;

defining the number of cells as T-control, where the number of cells is equal to one-half the number of keys;

defining a signal of the additional control line that indicates a last valid cell in a column as Z-control;

comparing the two keys of each buffer wherein said comparing is comprised of:

performing the following step 1 beginning with the top cell:

decrement C-control by 1 when C-control and T-control are both greater than zero; and if C-control is not less than T-control, then do the following:

for the first row of cells compare the keys A and B and move the smaller key and its pointer to B-buffer of the current cell;

move the larger key and its pointer to the B-buffer of the next down cell;

for the second row of cells and down compare the keys A and B, move the smaller key and its pointer to the A-buffer at the next up cell, and move the larger key and its pointer to the B-buffer at the next down cell if Z-control is not on;

unless otherwise if Z-control is on move the larger key and its pointer to the A-buffer at the current cell;

repeating the above step 1 process, after moving down a cell, until C-control is less than T-control;

performing the following step 2 beginning with the first cell of the second column;

decrement C-control by 1 when C-control and T-control are both greater than zero; and for the first row of cells compare the keys A and B and output the smaller key and its pointer to A-output buffer, and move the larger key and its pointer to the B-buffer of the current cell if Z-control is not on;

unless otherwise if Z-control is on, output the larger key and its pointer to B-output buffer;

for the second row of cells and down compare the keys A and B, move the smaller key and its pointer to the A-buffer at the next up cell, and move the larger key and its pointer to the B-buffer of the current cell if Z-control is not on;

unless otherwise, if Z-control is on, output the larger key and its pointer to the B-output buffer;

repeating the above step 2 process, after moving down a cell, until C-control is equal to zero, where C-control resets T-control to zero; and Z-control is set to zero; and stopping the process when either C-control or T-control is zero, wherein the sorted/merged data is stored in the output buffers such that A-output buffer contains the smaller value in ascending order and the B-output buffer contains the larger values in descending order.

* * * * *